June 29, 1943.  A. PELTZER  2,323,077
STARCH MANUFACTURING PROCESS
Original Filed Jan. 14, 1933   8 Sheets-Sheet 1
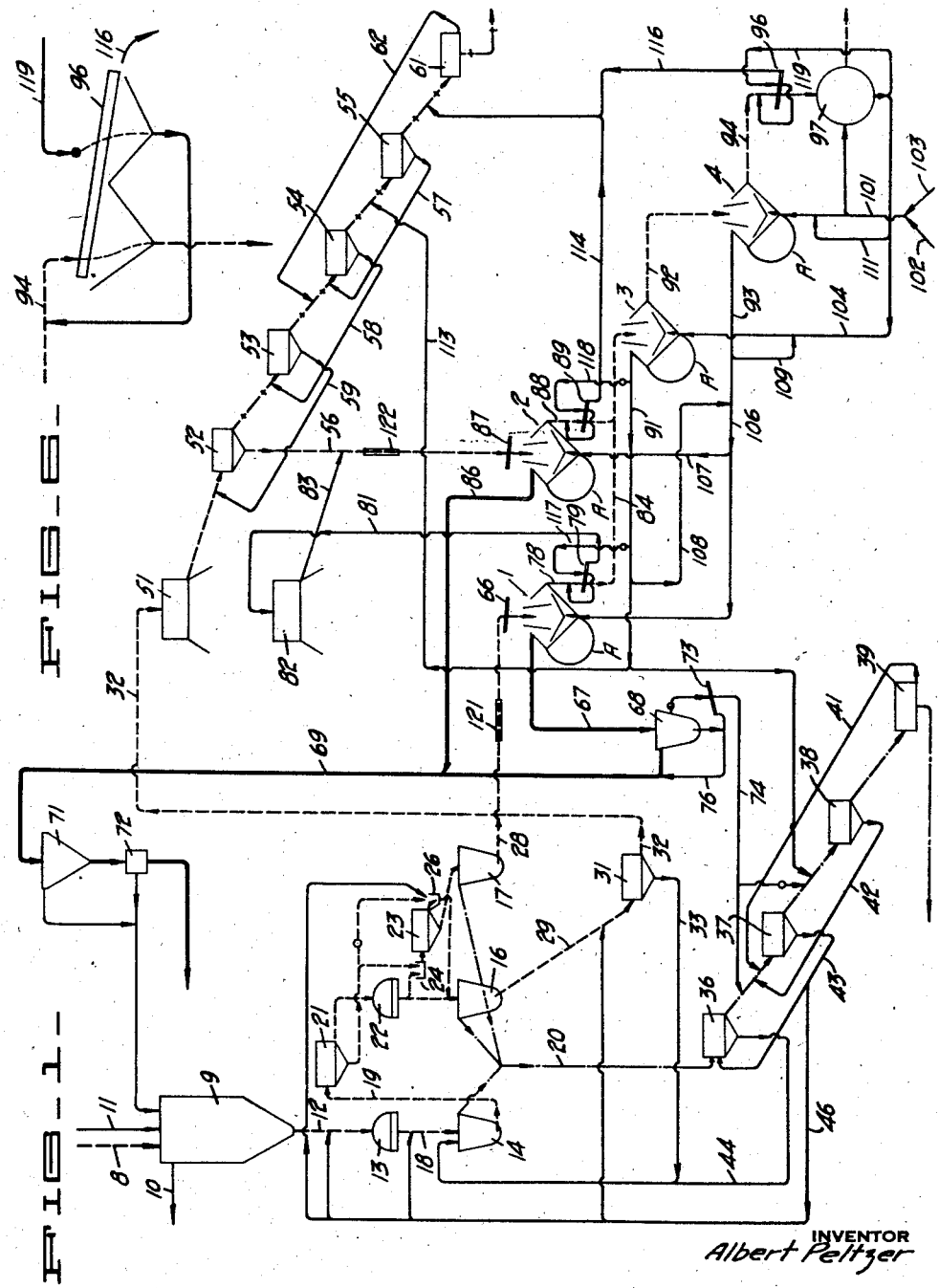
INVENTOR
Albert Peltzer
BY
ATTORNEY

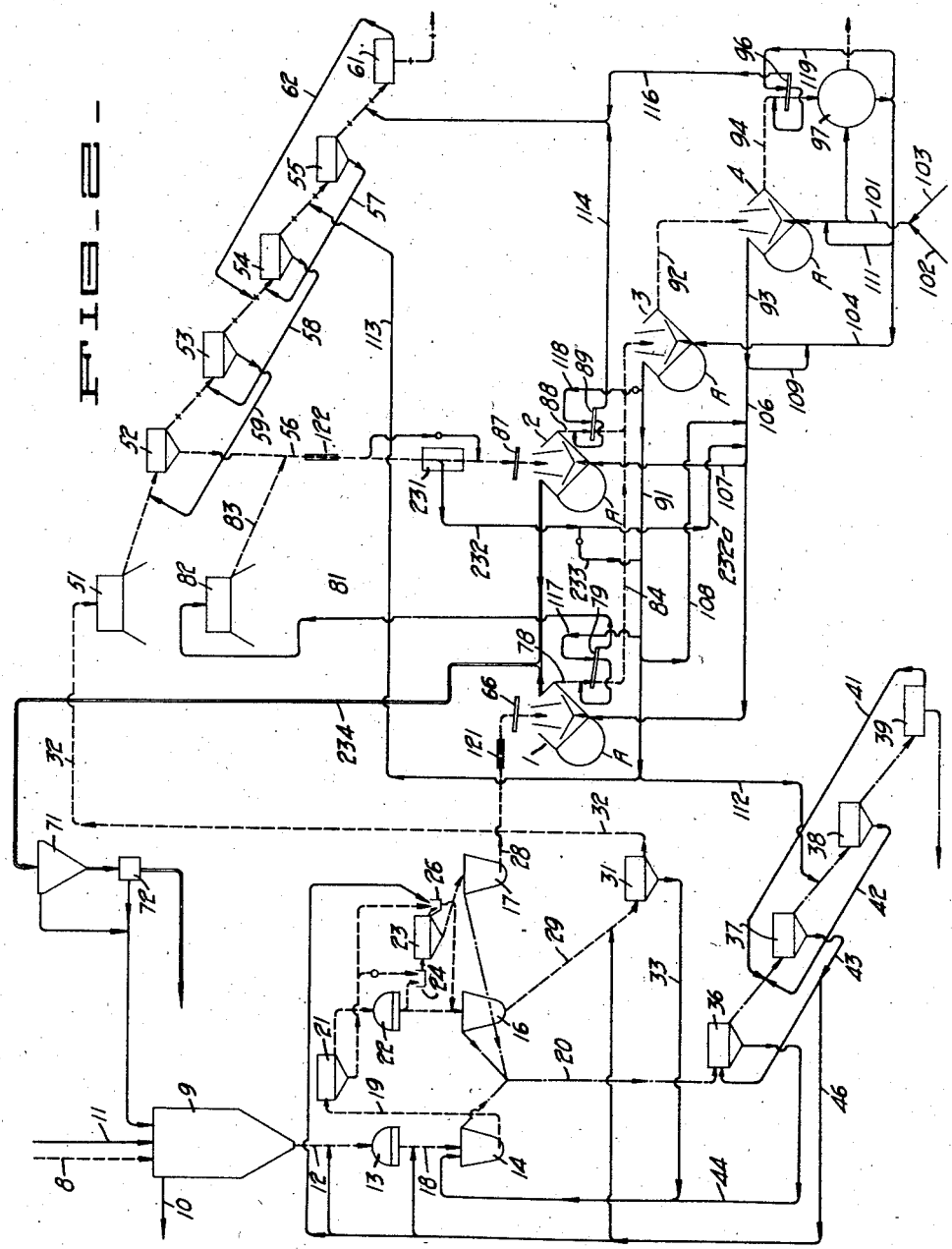

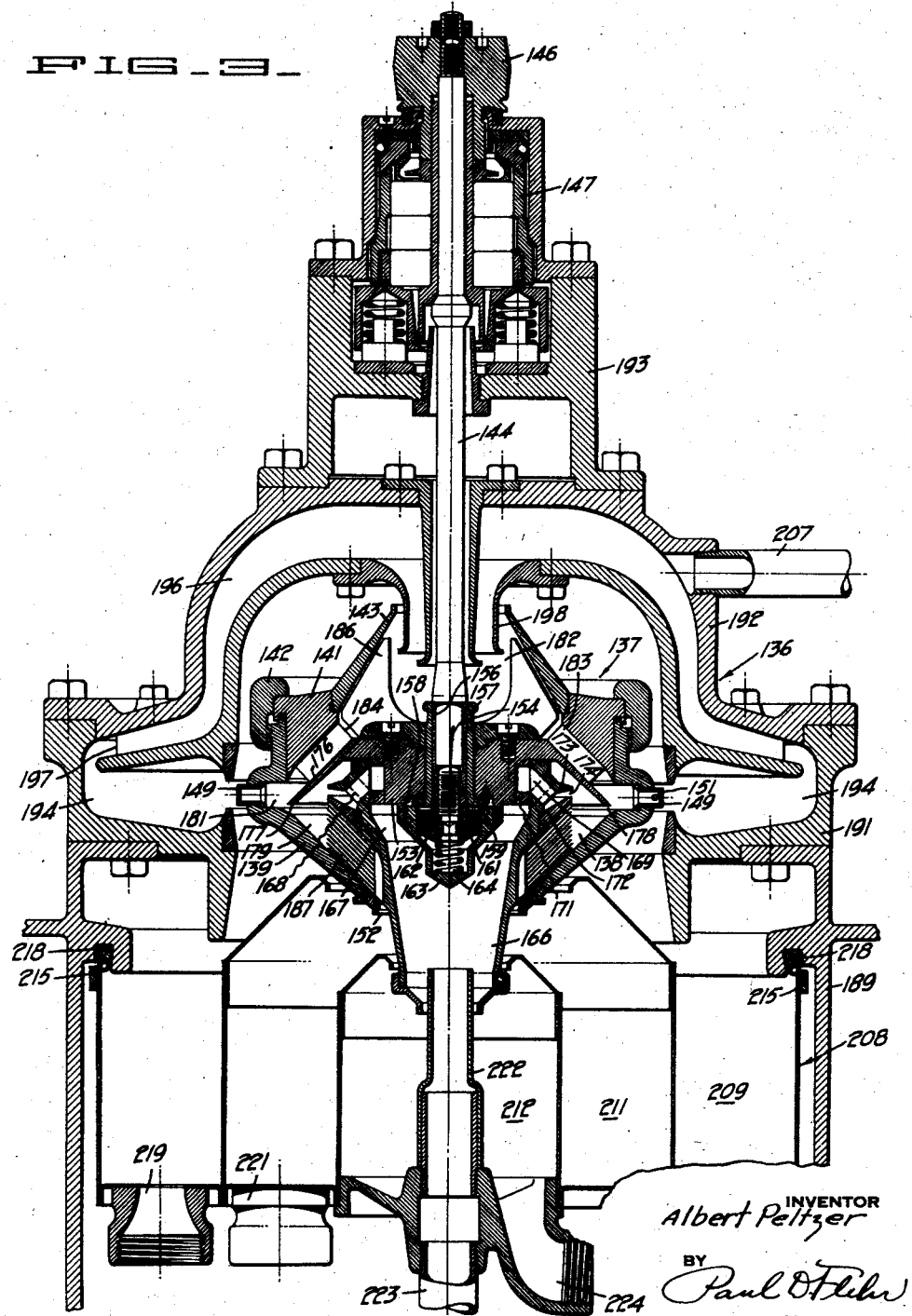

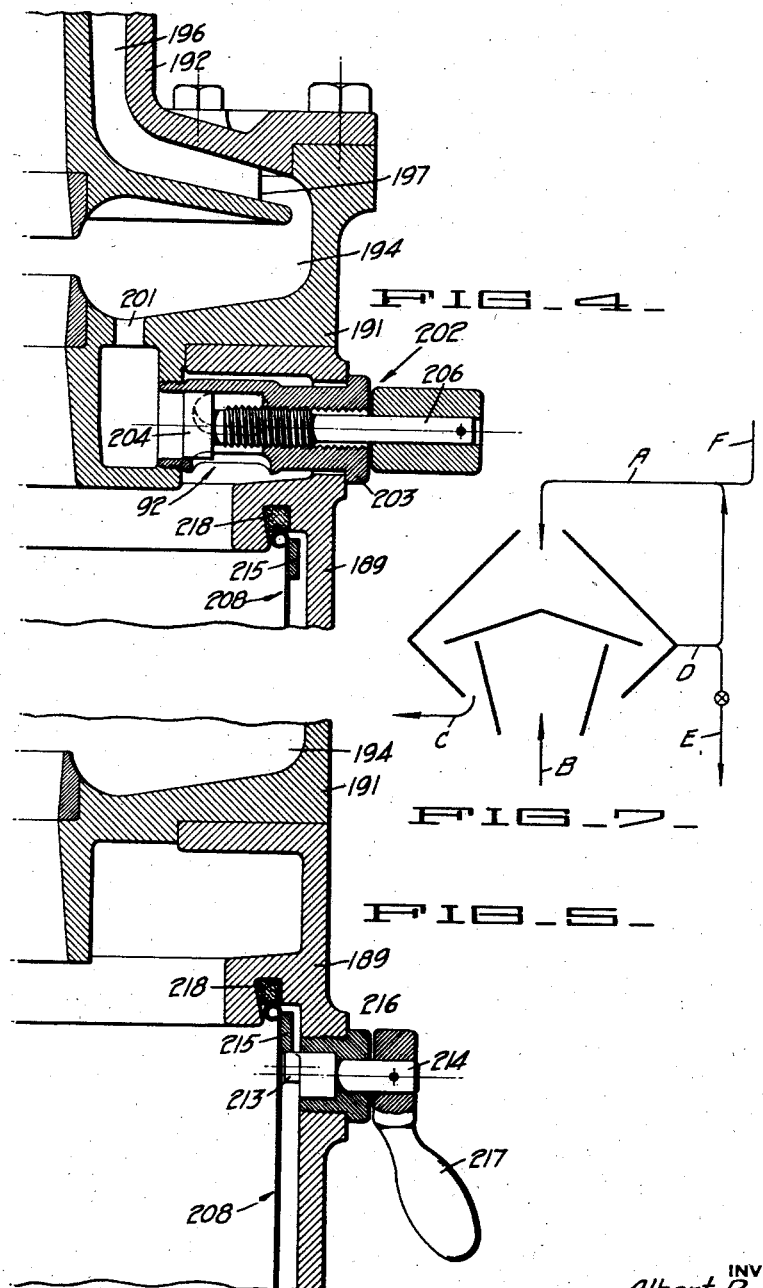

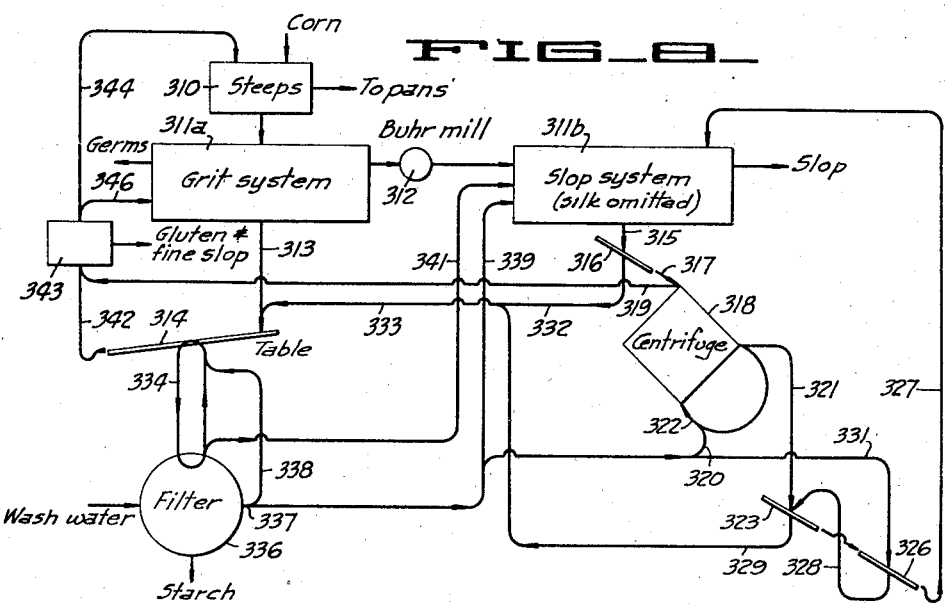
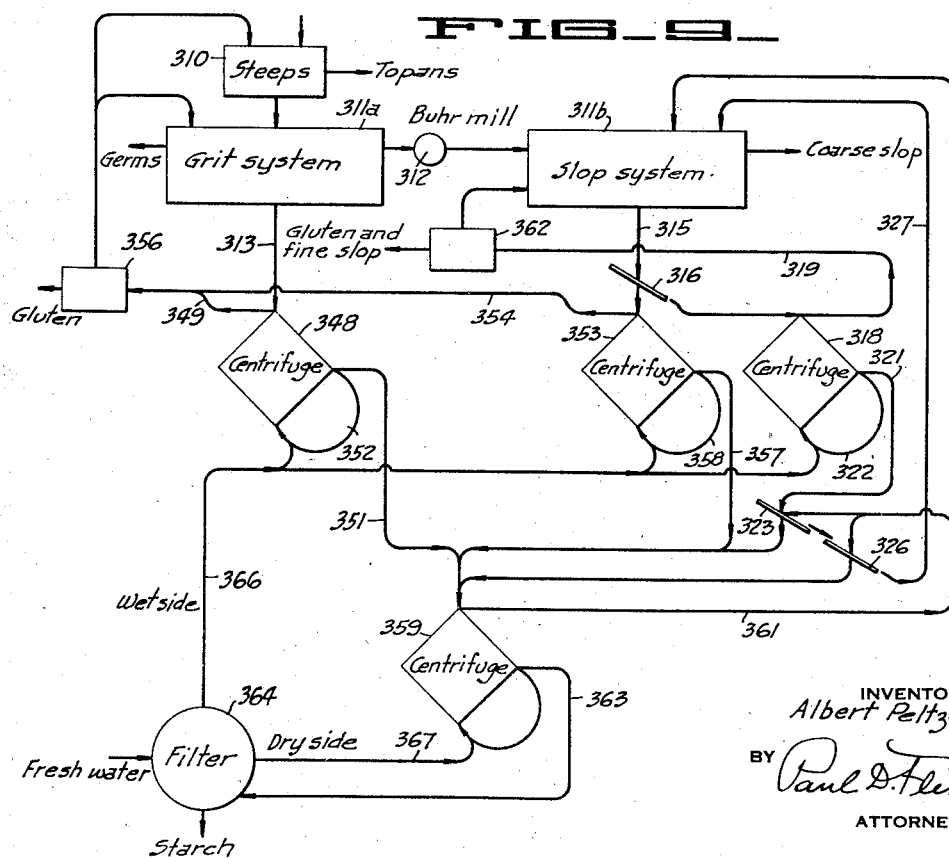

June 29, 1943.  A. PELTZER  2,323,077
STARCH MANUFACTURING PROCESS
Original Filed Jan. 14, 1933    8 Sheets-Sheet 6
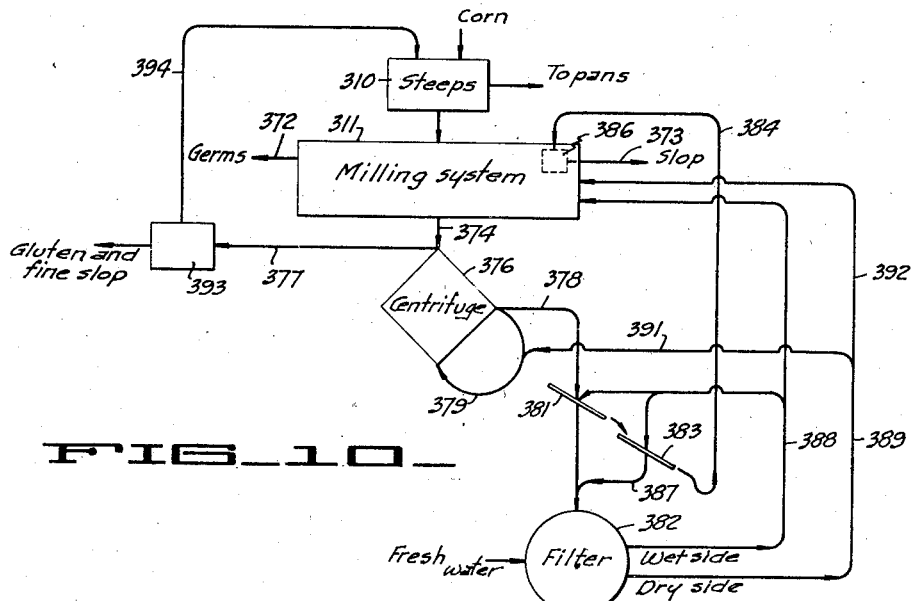
FIG_10_
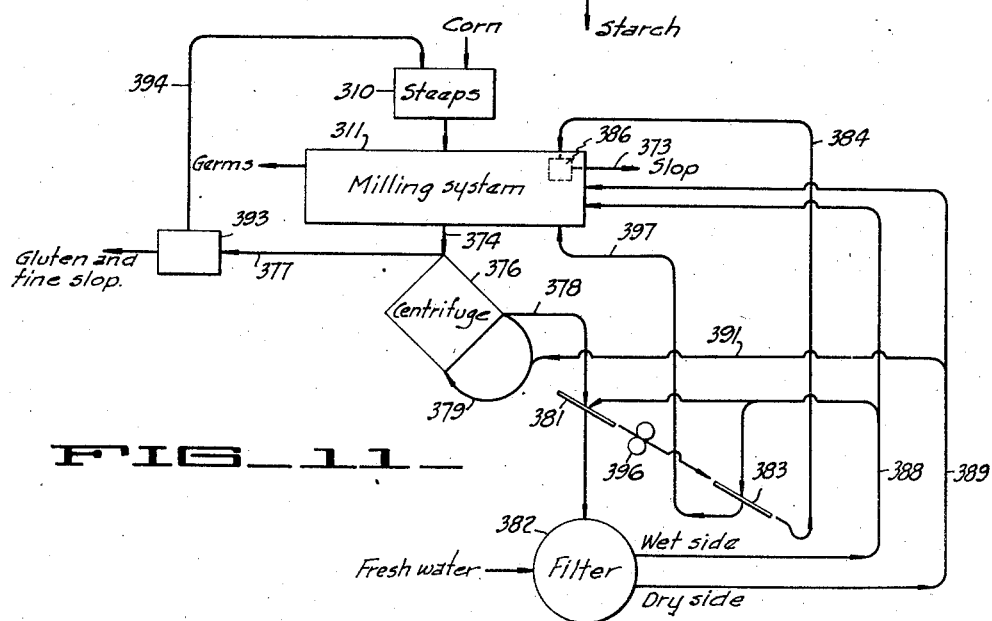
FIG_11_
INVENTOR
Albert Peltzer
BY
ATTORNEY

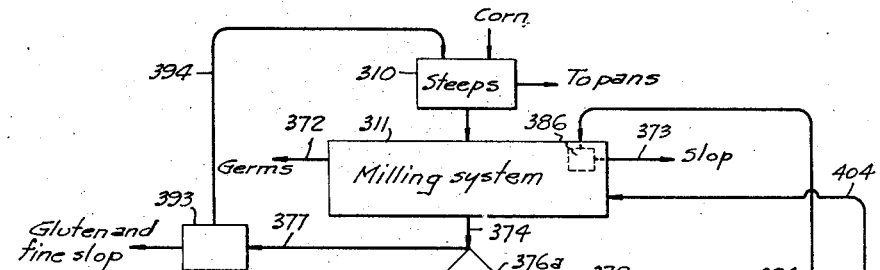
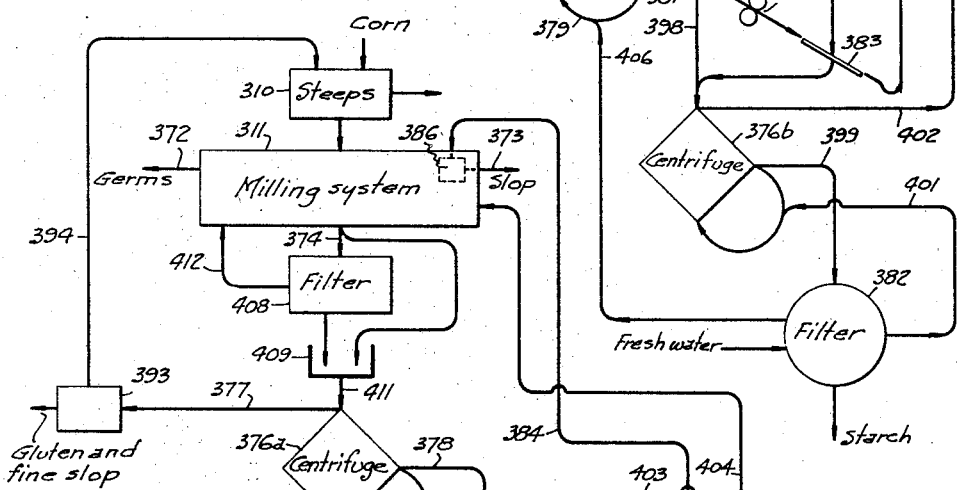
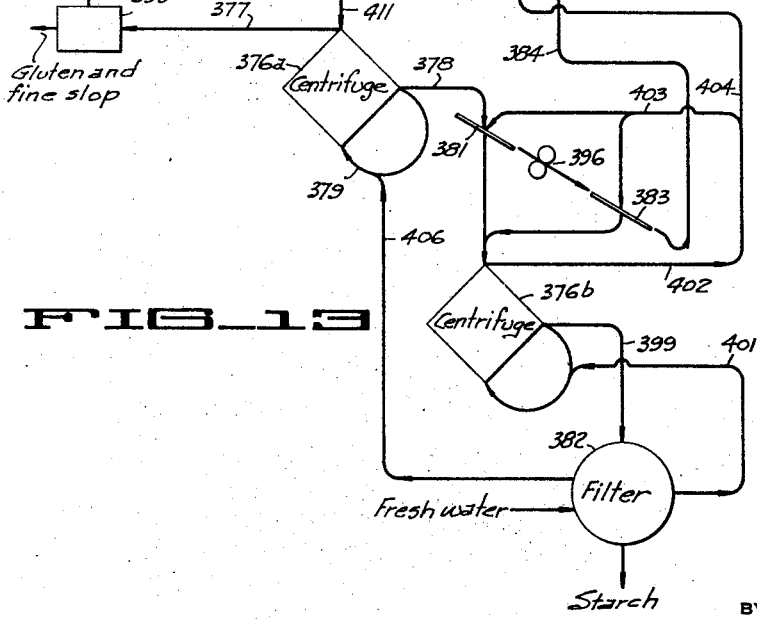

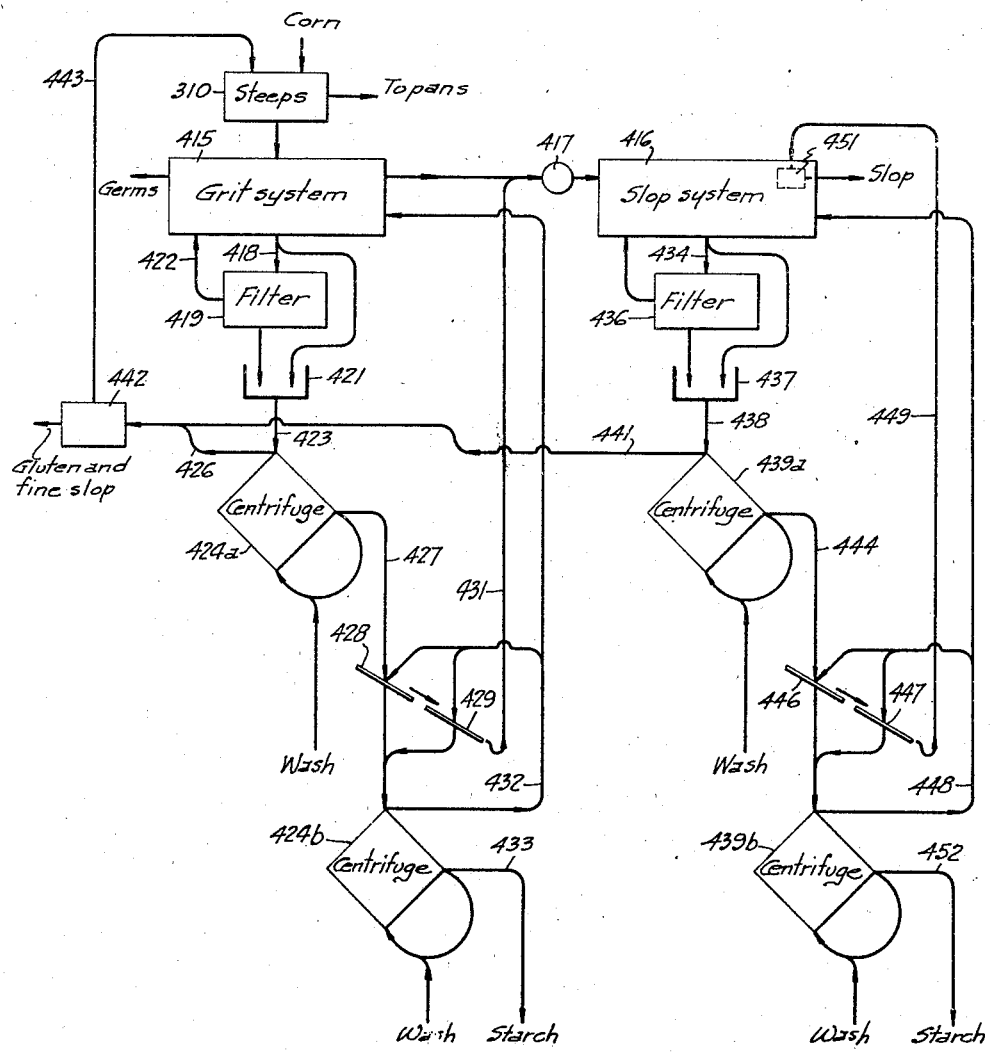

Patented June 29, 1943

2,323,077

UNITED STATES PATENT OFFICE 2,323,077

STARCH MANUFACTURING PROCESS

Albert Peltzer, San Francisco, Calif., assignor to Merco Centrifugal Co., San Francisco, Calif., a corporation of California Continuation of applications Serial No. 651,701, January 14, 1933, and Serial No. 741,528, September 11, 1934. This application November 5, 1942, Serial No. 464,632

48 Claims. (Cl. 127—68)

This invention relates generally to the commercial manufacture of starch from starch bearing materials, like Indian corn.

It is an object of the invention to provide a process and system for the manufacture of starch which will be relatively efficient, particularly with respect to the yield of starch and the amount of water required.

It is a further object of the invention to provide a process and system of starch manufacture which will require only a small number of silk screens or reels, compared to prior practice, and which will utilize such screens or reels in a more effective manner.

Another object of the invention is to provide a system which will use only comparatively fresh water in the milling process, and which will particularly avoid the reuse of water which has passed through gluten settling operations.

A further object of the invention is to provide a process and system which will dispense entirely with conventional tabling of mill starch to separate starch from the gluten. In this connection the invention is characterized by the use of centrifuging, which is preferably applied before treatment with silk screens or reels to remove fine fiber (conventionally known as fine slop). Centrifuging is also employed to wash the starch, thereby enabling manufacture of products of great purity.

A further object of the invention is to provide a novel process using centrifuging for primary separation between starch and gluten, with simultaneous displacement of solubles into the overflow, and with novel utilization and distribution of process liquors derived from the gluten overflow and the starch underflow.

Another object of the invention is to provide a novel process utilizing centrifuges and having provision for supplying starch containing magmas of proper gravity for the centrifuge operation or operations.

Another object of the invention is to provide a novel centrifuging process or method making use of a counterflow series of centrifuge stages, the process being characterized by economical wash water requirements and effective separation of the desired solid components like starch, from contaminants like gluten and so-called solubles.

Another object of the invention is to provide a novel centrifuge process or method making use of a counterflow series of centrifuge stages for the separation of various solids from magmas containing solids in suspension.

A further object of the invention is to provide a wet starch process having a novel procedure for obtaining relatively clarified process liquor for reuse in the system, the procedure involving special treatment of the overflow from a centrifuging operation being supplied with a starch-gluten magma for primary separation.

A further object of the invention is to provide a process involving an improved procedure for the handling of grits, which is characterized by direct centrifuging of a magma containing finely divided starch, starch grits, and gluten.

A further object is to provide a novel procedure making it possible to draw off a comparatively heavy grit starch without employing conventional thickening equipment.

Further objects of the invention will appear from the following description in which the preferred embodiments of the invention have been set forth in detail in conjunction with the accompanying drawings.

Referring to the drawings:

Fig. 1 is a diagrammatic flow sheet illustrating a system for the manufacture of starch, incorporating the present invention.

Fig. 2 is likewise a flow sheet illustrating a modified system incorporating the present invention.

Fig. 3 is a side elevational view, in transverse cross section, illustrating a centrifuge which can be utilized in the systems of Figs. 1 and 2.

Fig. 4 is a cross sectional detail, illustrating valve means for withdrawing a controlled amount of underflow from the centrifuge of Fig. 3.

Fig. 5 is a cross sectional detail, illustrating the manner in which collecting means for receiving separated components from the centrifuge, is detachably retained to the main centrifuge structure.

Fig. 6 is a diagrammatic view illustrating the nature of certain parts of the system shown in Figs. 1 and 2.

Fig. 7 is a diagrammatic view illustrating the manner in which the centrifuge of Fig. 3 operates in conjunction with the invention.

Fig. 8 illustrates another embodiment of the invention in which starch bearing material relatively high in fine slop content is directly centrifuged.

Fig. 9 illustrates another embodiment of the invention differing from Fig. 8 particularly with respect to use of centrifuges for primary separation in place of tabling.

Fig. 10 illustrates a simplified embodiment of the invention in which a single stage of centrifugal treatment carries out primary separation on a combined mill starch stream containing fine slop.

Fig. 11 illustrates another embodiment of the invention differing from Fig. 10 particularly in that grits are carried in the mill starch stream being fed to the centrifuging operation.

Fig. 12 illustrates another embodiment of the invention differing from Fig. 11 particularly in that two centrifuges are arranged in series with silk or fine screening interposed between the two stages.

Fig. 13 illustrates a further embodiment of the invention differing from Fig. 12 particularly in that the combined mill starch stream is subjected to filtering and repulping to provide a relatively high gravity magma for feeding the first centrifuge stage.

Fig. 14 represents another embodiment of the invention in which grit starch and Buhr mill starch are separately centrifuged.

Before explaining my process and system, it should be noted that certain arbitrary conventions have been followed in the flow sheets of Figs. 1 and 2. Thus a dotted line has been used to indicate the main starch flow. Double solid lines, that is two lines in close parallelism, indicate the main gluten flow. Dot-dash lines indicate the main germ flow; double dot-dash lines the main coarse slop flow; and single solid lines indicate auxiliary flow.

In common with processes of the prior art, in this invention the corn is first disintegrated to permit separation of certain components for further treatment. Thus referring to the flow sheet of Fig. 1, line 8 represents introduction of corn to the steeping system or apparatus 9. Line 10 represents a steep water overflow, while line 11 represents introduction of sulphur dioxide. Line 12 represents introduction of steeped corn from 9 to the degerminator or cracking mill 13.

The next step of the process is to remove germs from the disintegrated corn. Thus I have shown a plurality of germ separators 14, 16 and 17, the disintegrated corn being delivered to the first separator 14 by line 18. Line 20 indicates removal of the germs from the separators 14, 16 and 17. Removal of that component containing the bran with some of the starch, from separator 14, is represented by line 19. This component is treated by a grind reel 21, to remove bran, and the coarser material from the grind reel 21 is then treated in a further cracking mill or degerminator 22. Cracked material from degerminator 22 is shown being delivered to the second germ separator 16.

The third or auxiliary germ separator 17 makes available a grit starch from which a certain amount of the desired starch can be immediately separated, before further treatment with a Buhr mill. In conjunction with the auxiliary germ separator 17, I employ a second grind reel 23, which is fed from a mixer box 24. Mixer box 24 receives material from the outflow side of degerminator 22, and also a certain part of the finer or screened material from the grind reel 21. The remainder of the finer material from grind reel 21, is shown being delivered into a launder 26, from which a flow occurs to the germ separator 16. Launder 26 also receives the coarser components from the grind reel 23, while the finer component from this reel is delivered to the auxiliary germ separator 17, for recovery of small particles of germ. With such an arrangement, the grit starch made available from the germ separator 17 will contain a considerable quantity of finely divided starch particles which can be removed with advantage before the material is treated in a Buhr mill, and likewise this grit starch will be substantially free of bran. The removal of this grit starch from germ separator 17 has been indicated by line 28.

Removal of the separated starch bearing component from separator 16, has been indicated by line 29, and is treated in a grind reel 31. Line 32 indicates removal of a grit starch (carrying the unground material) from this reel for further treatment, while line 33 indicates removal of a component which is returned to the germ separator 14.

With the arrangement of degerminator, germ separator, and grind reels, such as explained above, it is possible by proper control to have the grit starch drawn off by way of line 28 at a relatively higher gravity than the grit starch as drawn off in conventional processes. In conventional processes the grit starch is drawn off from the bottom discharge of the germ separators. Such operation makes for best efficiency, because I prefer to immediately subject the grit starch removed by way of line 28 to centrifugal separation, before treatment of the same in a Buhr mill or like grinding apparatus. Since the hulls have been removed from material introduced into separator 17, small particles of germ can be recovered and grit starch can be drawn off at a materially higher gravity than would be possible in a germ separator where hulls or bran are present.

The component removed as an overflow from the germ separators 14, 16 and 17 by way of line 20, is shown being delivered to the first of a series of germ reels 36, 37 and 38. These reels are connected in counterflow relationship with the separated germ flow from the first reel 36 feeding the second reel 37, and the germ flow from the second reel 37 feeding the third reel 38. The separated germ flow from reel 38 is supplied to an expeller 39, where excess water is removed. Water or wash liquor can be supplied at various points in this system, as for example the water expelled at 39 can be returned to the feed of germ reel 37, by line 41. The flow from reel 38, from which the germs have been separated, can likewise be returned to the feed of reel 37, as indicated by line 42. Similarly the filtrate from reel 37 can be introduced together with the feed to reel 36, as indicated by line 43. Filtrate from the reel 36, is shown being introduced into the germ separator 14, together with filtrate from reel 31, by way of line 44. A certain amount of filtrate from reel 37 is shown being returned to certain parts of the degerminating and germ separating system by way of line 46. Thus one part of the filtrate returned by way of line 46 is shown being introduced into the germ separator 14 together with the feed from line 18, another part is shown being introduced together with the feed to the degerminator or disintegrator 13, and another part into the launder 26 which in turn feeds germ separator 16.

Thus far I have disclosed that portion of my process and system which effects disintegration or degermination of the corn, and removal of starch from the disintegrated corn to form grit starch for further treatment. I shall now describe that portion of my process and system for further treatment of the grits and the other components in need of grinding. These components, removed by way of line 32, are shown being treated in a suitable mill 51, such as a Buhr mill, where they are finely ground. To remove coarse slop from the material discharged from Buhr mill 51, and also from material taken from other parts of the process, I have shown a plurality of slop reels 52, 53, 54 and 55. Buhr mill 51 feeds the Buhr slop reel 52, and the filtrate from this reel, represented by line 56, forms a mill starch for further treatment. The coarse slop, containing principally coarse fibrous material, separated out by reel 52, feeds reel 53. Similarly reel 53 feeds reel 54, and this latter reel feeds the reel 55. A counterflow effect is secured by having the filtrate from reel 55 returned together with the feed to reel 54, as indicated by line 57. Likewise line 58 indicates return of filtrate from reel 54 to reel 53. Line 59 also indicates return of filtrate from reel 53 to the feed to reel 52. The material separated out in reel 55 is delivered to an expeller 61, and the filtrate from this expeller is returned to the feed to reel 54, as indicated by line 62.

It has been previously stated that in effecting separation of the starch from gluten, I preferably utilize centrifuges in place of conventional tabling. The centrifuge utilized should be capable of continuous operation without clogging, and should be capable of efficiently separating the desired starch. In this connection I prefer to utilize centrifuges of the general type disclosed and claimed in certain copending applications, particularly application Serial No. 586,773, now Patent No. 2,013,668, and which is characterized by return of a part of the underflow back into the centrifuge chamber. A suitable centrifuge of this type will be presently described in detail. Referring again to the flow sheet of Fig. 1, the centrifuges illustrated have been numbered 1 to 4 inclusive. Each of these centrifuges is shown provided with a return circuit identified by letter A which serves to return a part of the heavier underflow back into the centrifuge chamber. The feed to centrifuge 1 is the relatively high gravity grit starch, from line 28. A shaker 66 may be imposed in this flow line, to remove stray oversize particles. The overflow from centrifuge 1, which consists largely of gluten, is shown being removed by way of line 67 and is delivered to a separator 68. From separator 68, the gluten is delivered by line 69, to a settler 71. The thickened material from settler 71 is treated in a filter press 72, where excess water is removed to recover gluten and fine slop. The overflow from settler 71, together with the water removed in the filter press 72, is returned to the steep system 9. With respect to the other components separated out at 68, one component is treated by a silk shaker 73, and the filtrate from this shaker introduced together with the feed to the germ reel 37, by way of line 74, and the other component (a relatively clear liquor) is introduced into the gluten flow line 69, by way of line 76, together with the material separated out by silk shaker 73. As will be presently explained, introduction of filtrate by way of line 74 to the germ reel 37, serves to compensate for an excess flow of water to centrifuges 1 and 2 and to regulate the gravity of grit starch to the first centrifuge.

The starch underflow from centrifuge 1, represented by line 78, is treated by one or more silk shakers 79 to remove grits, and the grits so removed are shown introduced by way of line 81, to a second Buhr mill 82. The finely ground material from Buhr mill 82 is shown being introduced into the Buhr mill starch line 56, by way of line 83. After grits have been removed from the underflow of centrifuge 1 the liquor is introduced as feed material to centrifuge 3, as indicated by line 84. The Buhr mill starch represented by flow line 56, serves to feed the centrifuge 2, the gluten overflow from which, represented by line 86 and containing a large amount of fine slop, is introduced into the settler 71 together with the gluten flow from centrifuge 1. The feed to the centrifuge 2 may likewise be treated by a shaker screen 87, to remove any stray oversize particles. The underflow from centrifuge 2, represented by line 88 is likewise treated by one or more silk shakers 89 to remove the fiber or residual slop content of the same, hereinafter referred to as small size coarse slop, and the material passing through this shaker screen is likewise merged with flow line 84 to form a feed for centrifuge 3.

Centrifuges 1 and 2 perform mainly a separating function, that is to separate starch from gluten and fine slop. Centrifuges 3 and 4 on the other hand perform mainly a washing function, that is to wash the separated starch to secure a product of high purity. The overflow from centrifuge 3 is represented by line 91, and the starch underflow by line 92. The starch underflow from centrifuge 3 is fed into centrifuge 4, the overflow from which is represented by line 93. The starch underflow from centrifuge 4 represented by line 94, may be treated by one or more silk shakers 96, of the type commonly known as proving shakers, and the material passing through these shakers is then delivered to a filter system 97 for removing water from the finished product.

In the operation of my process it is necessary to introduce a certain amount of fresh water into the system. Thus introduction of fresh water has been indicated by way of line 101. This fresh water is made up from one component 102 at ordinary temperature, which may contain a suitable chemical to control hydrogen ion concentration of the starch, and another component 103 at an elevated temperature and which may be a hot condensate. A part of this water is introduced into the return circuit of centrifuge 4, and another part into the filter system 97.

The various centrifuges are also connected in counterflow relationship with respect to each other. Thus line 104 indicates introduction of filtrate from the filter system 97, into the return circuit of centrifuge 3. Line 106, together with line 107, indicates introduction of overflow from centrifuge 4, into the return circuits of centrifuges 1 and 2. In order to secure an excess of water in the overflows of centrifuges 1 and 2, and to compensate for an excess flow of wash liquor to centrifuge 3, line 108 indicates introduction of a part of the overflow from centrifuge 3, into the overflow line 106 from centrifuge 4. Likewise to secure an excess of water in the overflow from centrifuge 3 and to compensate for excess flow of wash liquor to centrifuge 4, line 109 represents diversion of flow from line 93, to line 104. Similarly to secure an excess of water in the overflow from centrifuge 4, line 111 indicates diversion of flow from line 104 to the fresh water line 101 leading to centrifuge 4. It will be presently explained that with the type of centrifuge illustrated, sufficient wash liquor is provided so that a part of the water introduced with the return flows continually through the zone of separation, to be discharged with the overflow without dilution of the underflow.

Liquor and other material removed at various points from the centrifuge system can be utilized with advantage in other parts of the process. Thus I have shown the overflow liquor from line 91, being diverted to two portions, one portion flowing by way of line 113 and being introduced together with the feed to slop reel 55. The fibrous material which does not pass through the silk shaker 89, is shown being delivered by line 114 to the feed leading to expeller 61. Likewise the material which does not pass through shaker 96, is shown merged with the flow through line 114, by way of line 116.

Silk shakers 79 and 89, in addition to treating the underflow from centrifuges 1 and 2, also preferably use a certain amount of overflow material from centrifuge 3, diverted from line 91 as wash water for the slop contained in the underflow from centrifuges 1 and 2. Thus line 117 represents diversion of overflow from line 91, through the shaker screen 79, the resulting filtrate being introduced into the underflow line 78. Likewise line 118 indicates diversion of overflow from line 91 to the silk shaker 89, with the resulting filtrate being introduced into the underflow line 88. With respect to the silk shaker 96, line 119 indicates diversion of a part of the filtrate from the filtering system 97, to the silk shaker, with the resulting filtrate being introduced into the underflow line 94. Fig. 6 illustrates diagrammatically a suitable arrangement of one of the silk shaker systems, in this case the shaker 96. From this view it will be noted that the filtrate resulting from treatment of the underflow 94, is maintained separate from the filtrate resulting from treatment of the liquor flow from line 119.

The material being treated by the centrifuges, and by the silk shakers, should preferably be at an elevated temperature. For this purpose, in addition to introducing hot fresh water into line 101, a closed heater 121 is shown imposed in the grit starch line 28, and a closed heater 122 imposed in the Buhr mill starch line 56. Further heaters may be employed if desired, where a more elevated temperature will give good results, although because the passage of the starch through the centrifuge system is relatively rapid, a relatively small amount of heat loss occurs, and for that reason heating to the extent indicated gives good results.

Before describing the general mode of operation of my process, as represented by the flow sheet of Fig. 1, I shall first briefly describe a suitable type of centrifuge which can be utilized. Thus referring to Figs. 3 to 5 inclusive the centrifuge illustrated therein consists of a housing indicated generally at 136, within which there is a rotating structure 137. Structure 137 is formed to provide a centrifuge chamber 138, adapted to receive a fluid feed material, and which is also adapted for the simpler discharge of a centrifugally separated underflow and overflow. For manufacturing convenience, structure 137 is formed of a plurality of parts, part 139 forming the lower part of the structure, another annular part 141 which is secured to part 139 by ring 142, and an upper conical part 143 which is secured to part 141 by means of a threaded engagement. The entire structure 137 is mounted on the lower end of a drive shaft 144, the upper end of this shaft being supplied with a drive pulley 146 and being supported by suitable bearing 147.

For enabling the discharge of the underflow, that is, the heavier separated material from the chamber 138, tubular nozzles 149 are provided at circumferentially spaced points on the sides of the wall parts 139. These nozzles 149 have discharge orifices 151 directed backwardly with respect to the direction of rotation of structure 137. The overflow, that is the lighter centrifugally separated material, is adapted to be discharged over an annular wier 152, formed at the lower end of part 139.

For a proper understanding of the provision for introducing feed material into the centrifuge chamber, it will be necessary to describe the structure interposed below the lower end of shaft 144 and the outer portion of structure 137. It will be noted that part 141 is provided with an inner hub 153 which surrounds the lower end of shaft 144. Interposed between shaft 144 and hub 153, are the interfitting sleeves 154 and 156, which have a slight amount of play between them. Sleeve 156 is secured to shaft 144 by a threaded connection 157. The lower side of hub 153 is provided with a counterbore 158 to accommodate an annular shoulder 159 formed on the lower end of sleeve 154. The lower end of sleeve 156 is likewise provided with an annular shoulder 161 and interposed between shoulders 159 and 161 there is a slip ring 162. Cap 163 is threaded into counterbore 158 and interposed between this cap and the lower end of sleeve 156, there is a compression spring 164. Compression spring 164 serves to urge shoulders 159 and 161 together upon the faces of ring 162 so as to form a universal joint.

Depending from hub portion 153 there is an inverted, truncated, conical section 116, into which feed material is adapted to be introduced as will be presently explained. The upper part of section 166 forms together with hub 153, an annular feed chamber 167. From feed chamber 167 the feed material is delivered into centrifuge chamber 138, through two different sets of ports or ducts. One set of ducts 168 is spaced circumferentially and is inclined upwardly and outwardly. Another set of ducts 169 is likewise spaced circumferentially, but staggered with respect to ducts 168 and inclined downwardly and outwardly. The inner ends of ducts 169 engage with the ducts 171. Adjacent the discharge end of ducts 168 there is an inverted conical deflector 172, which together with annular edge 173 serves to form an annular discharge orifice 174 for feed material. Therefore feed material being discharged through duct 169 is deflected upwardly and outwardly by deflector 172 and is discharged into the centrifuge chamber through the orifice 174.

In order to cause all of the feed material discharged through annular orifice 174 and ducts 168 to flow outwardly and downwardly towards the periphery of the centrifuge chamber along a conical surface, there is a truncated conical wall portion 176 which may be integral with hub 153 and part 141. The outer edge 177 of portion 176 is so disposed as to form an annular opening 178 through which material must flow as it passes through the chamber by centrifugal force. Wall portion 176 therefore in effect divides the centrifuge chamber into two portions 179 and 181, the portion 181 being in direct communication with the discharge nozzles 149. Chamber portion 181 is also in communication with an upper auxiliary feed chamber 182, through downwardly and outwardly inclined passages 183, separated by webs 184. Feed chamber 182 is adapted to receive heavier material previously discharged from the centrifuge chamber, and to deliver the same back into the chamber portion 181 by means of passages 183. To impart rotary energy to the material in feed chamber 182, vanes 186 are provided, which can be suitably mounted upon the upper face of hub 153.

To aid in effecting efficient separation, a plurality of spaced conical discs 187 are disposed within the chamber portion 179, and concentric to the axis of shaft 144.

To properly understand the manner in which feed material is introduced into the rotating structure 137 and the centrifuge chamber, how the underflow and overflow discharges are handled after their delivery, and how a portion of the underflow is returned by way of the auxiliary feed chamber 182, it is necessary to describe the structure of housing 136. This housing is shown formed of a plurality of separable sections, the sections being numbered 189, 191, 192, and 193, and which are secured together by suitable means such as bolts. Section 189 forms a base or support, sections 191 and 192 form a volute for receiving the underflow and for effecting a return of a portion thereof back into the auxiliary feed chamber 182, while section 193 serves to support the journal 147 of shaft 144. The volute formed by sections 191 and 192 includes an annular chamber 194 which surrounds the discharge nozzles 149. It also includes passages 196 extending upwardly and inwardly and which are separated by webs 197. The upper ends of passages 196 communicate with the upper end of a depending duct 198, the lower end of which is disposed within the auxiliary chamber 182.

Referring to Fig. 4, a portion of the underflow discharge into annular chamber 194 can be diverted from the apparatus through a port 201 and a manually adjustable valve 202. The particular form of valve 202 illustrated consists of a sleeve 203 forming a cylinder adapted to receive the sliding valve plug 204. Valve plug 204 can be adjusted by turning stem 206, to more or less restrict flow of material through the valve. Also communicating with passages 196, there is a pipe 207 whereby additional fluid material can be intermixed together with a portion of the underflow for return to the auxiliary chamber 182.

Disposed within the lower housing section 189 there is a receiving vessel 208 formed to provide a plurality of annular compartments 209, 211 and 212. To facilitate attachment and removal of this receiving vessel, means is provided such as shown in Fig. 5. In this case the upper edge of the outer wall of receiving vessel 208 is provided with a stem 215 adapted to be engaged by cam member 213. Cam member 213 is mounted upon a shaft 214 which in turn is journalled within a bushing 216. This bushing is mounted in the side wall of housing section 189. A handle 217 is secured to the outer end of shaft 214, to enable manual turning movement to engage or disengage member 213 with rim 215. It is preferable to provide a plurality of such devices spaced around the housing section 189 so that the upper edge of the receiving vessel can be tightly engaged with a sealing ring 218. The outer receiving vessel compartment 209 is adapted to receive underflow material flowing through valve 202, and from this compartment material can be removed through an outflow opening 219. The inner compartment 211 receives the overflow material being discharged over wier 152 and from this compartment material can be removed through opening 221. Extending upwardly from the center of the receiving vessel 208 and within the inner compartment 212, there is a conduit 222 which, when the receiving vessel 208 is in normal position, has its upper end extending into the lower end of conical portion 166. Feed material is introduced into conduit 222 by way of pipe 223. Any spill of feed material is caught by the inner compartment 212 and can be removed by way of opening 224.

The machine described above has been diagrammatically illustrated in Fig. 7 to clarify the method involved when the machine is utilized in the present process. Line B in this figure represents introduction of starch bearing liquor into the machine. Line C represents the gluten overflow, while line D represents an underflow consisting largely of starch particles. A controlled portion of the underflow, designated by letter E, is removed for final delivery. The remaining portion indicated by letter A is being returned back into the centrifuge. Line F indicates introduction of wash liquor, into the return circuit A. To compare Fig. 7 with the actual machine of Fig. 3, line B of Fig. 7 is representative of conduit 222 of Fig. 3. Line C of Fig. 7 is representative of the discharge of lighter separated material over wier 152 of Fig. 3. Line D of Fig. 7 is representative of the discharge of the underflow of heavier separated material from the orifices 151 of Fig. 3. Final delivery indicated by letter E in Fig. 7 is by way of port 201 and the manually controlled valve illustrated in Fig. 4. The return A of Fig. 7 is representative of annular chamber 194, passages 196 and depending conduit 198 of Fig. 3.

Referring now to the flow sheet of Fig. 1, it will be noted that centrifuges 1 to 4 inclusive are for convenience shown in inverted positions compared to the representation of Fig. 7, and that the underflow has been illustrated being discharged from both sides of the machine, one being for final delivery, and the other for the return circuit. Comparing centrifuge 2 particularly with Fig. 7, introduction of Buhr mill starch by way of line 56, corresponds to the feed B in Fig. 7. Introduction of wash liquor by way of line 107 corresponds to line F. The underflow diverted from the centrifuge 2 by way of line 66, corresponds to line E of Fig. 7, while the return circuit is designated by letter A in both figures. Assuming that the machine described in detail with respect to Figs. 3 to 5 inclusive is utilized for the centrifuge 2 of Fig. 1, Buhr mill starch, containing considerable fine fiber, is continuously fed through conduit 222, from the upper end of which it is continuously introduced into the inverted conical portion 166. As the mill starch moves upwardly through the interior of portion 166, by virtue of centrifugal force, a preliminary classification takes place. From this preliminary classification the heavier classified material of the Buhr mill starch is discharged from chamber 166 through conduit 168 upon the inner surface of the conical portion 176. The lighter components resulting from the preliminary classification flow through conduit 171 and 169 through annular orifice 174, and then into the centrifuge chamber portion 179. The heavier starch particles of the feed, by virtue of the centrifugal force to which they are subjected, are moved towards the periphery of the centrifuge chamber and through the orifice 178. The lighter centrifugally separated material consisting largely of gluten, together with fine fiber, flows toward the center of rotation, and discharges over wier 152. The underflow consisting principally of starch particles together with water, discharges continually through nozzles 149, and by virtue of the kinetic energy of the discharge, a portion of this underflow is caused to flow upwardly and inwardly through passages 196, and to be redelivered into the auxiliary feed chamber 182. The remainder of the underflow is diverted through valve 202 to the outer receiving vessel compartment 209, for final delivery. That portion of the underflow which is returned to the auxiliary chamber 182 flows outwardly through passages 183 and is discharged into the outer portion 181 of the centrifuge chamber. Wash liquor is continuously introduced by way of pipe 207. This wash liquor intermixes with the underflow being returned into the centrifuge by way of passages 196 and is likewise delivered together with this returned underflow into portion 181 of the centrifuge chamber.

In operating the centrifuge for a proper separation between starch, and gluten together with fine fiber, for a given rate of Buhr mill starch feed, the rate of return of underflow is considerably greater than the rate with which a portion of the underflow is diverted for final delivery. A ratio which has given good results for a centrifuge having an inside bowl diameter of about ten inches and revolving at about 5400 revolutions per minute, is about 10 to 1, that is the rate of return of underflow discharged from the nozzles is about 10 times greater than the rate of removal of underflow for final delivery.

Certain peculiar effects occur when the centrifuge machine described herein, is operated upon Buhr mill starch in the manner just described. One effect is that a scrubbing action of the starch particles in the underflow takes place, as this underflow passes through nozzles 149 and orifices 151. This scrubbing action occurs because the flow of material is at relatively high velocity, due to the use of a relatively high speed of rotation for the centrifuge rotor. High velocity flow through nozzles 149, and orifices 151, necessarily sets up violent turbulence within the stream of material, and this turbulence causes a scrubbing of the starch particles. It has been found that this scrubbing action plays a material part in securing proper separating action, as it tends to free the starch particles of films of colloidal material, such as gluten.

A scrubbing action also takes place in another part of the machine, namely, in the centrifuge chamber portion 181, adjacent the inlets to the nozzles 149. Scrubbing action in this region is likewise caused by turbulene or violent agitation. Such turbulence or violent agitation results from an exchange in energy between the material returned into the centrifuge chamber by way of auxiliary feed chamber 182, and the material separated from the Buhr mill starch which flows into chamber portion 181 through annular orifice 178. Agitation within chamber portion 181 not only serves the useful purpose of scrubbing separated starch particles, but also serves to scour out the adjacent surfaces of the rotor, to prevent clogging of nozzles 149 and to prevent accumulations of solid materials. The rate of return of the underflow discharge adjusts itself in response to the starch discharge in such a manner that the additional wash liquor introduced by way of pipe 207 (line F in Fig. 7 and line 107 in Fig. 1) does not all discharge through nozzles 149 with discharge particles, but part of it is caused to counterflow through the chamber portion 179, to be discharged from the rotor together with the separated gluten and fine fiber over wier 152. This counterflow of wash liquor likewise serves several useful purposes. Because it is mixed with the underflow and introduced into centrifuge chamber portion 181, its flow inwardly through centrifuge chamber 179 causes this liquid to carry with it a certain amount of gluten and solubles scrubbed from the starch particles in centrifuge portion 181 without diluting the underflow. Likewise the counterflow of the wash liquor through centrifuge portion 179 assists in effecting separation between the starch and gluten of the Buhr mill starch feed. If desired the amount of wash liquor can be so adjusted as to tend to produce a quiescent zone of separation within the rotor. Such a method has been described and claimed in Patent No. 1,945,786.

A peculiar effect upon the centrifugal separation, is caused by the presence of fine fiber in the Buhr mill starch. It has been found that when this fiber is present in the feed to the centrifuge, a more effective separation takes place between the starch particles and the gluten. It is because of the counterflow effect within the zone of separation, that the fiber is separated from the starch particles and delivered from the centrifuge together with the gluten overflow. According to my observations the relative movement between the fine fiber and the starch particles, causes the presence of the fine fiber to be effective in securing more efficient separation. Apparently there is a mechanical wiping action, that is the fine fiber wipes the starch particles to assist in removing adhering films of gluten.

Centrifuge 1 operates in substantially the same manner as centrifuge 2, except that it is fed with grit starch from line 28, in place of Buhr mill starch. In this case the feed contains some fine slop in addition to a comparatively greater amount of coarse slop. Centrifuges 3 and 4 likewise operate in substantially the same manner as centrifuge 2. However as previously stated the chief function of these latter centrifuges is to effect further washing of the starch underflow from centrifuges 1 and 2, after fibrous material has been removed by the silk shakers 79 and 89. Thus fine fiber does not enter into the separating action in centrifuges 3 and 4, although more effective washing of the starch particles is made possible by scrubbing, as has been previously described.

It is believed that operation of the process as a whole will be evident from the above description with respect to the flow sheet of Fig. 1, and with respect to the centrifuges utilized. In general the process may be carried out continuously, although materials may be stored at various points if desired. The various apparatuses indicated in the flow sheet can of course be operated singly or in multiples, depending upon the plant capacity required, and depending upon conditions encountered in practice.

Certain desirable characteristics of my process are as follows: A high yield of starch is made possible, because of the effective separation between starch and gluten, and likewise the resulting starch product is of relatively high purity. A relatively small amount of fresh water is required for carrying out the process, in addition to that introduced into the steep system, because of the elimination of tabling methods, and because of the manner in which various available liquors at different points in my process are utilized. An attribute of considerable importance from the standpoint of plant installation and maintenance, is the fact that a relatively small number of silk shakers are utilized, compared to prior conventional practice. This is due to the fact that fine fiber is not removed from the starch flow, before centrifuging to effect the major separation between the starch and gluten. Since the major portion of the fine fiber is delivered together with the gluten in the overflows from centrifuges 1 and 2, it is obvious that the work of separating fine fiber from the underflow starch is materially simplified. In addition to simplifying the problem of removing the fine fiber from the starch, it has been previously pointed out that the presence of the fine fiber in the feed to centrifuges 1 and 2, makes possible more efficient separation of the starch.

It is desirable at this point to amplify upon the nature of fibrous matter present in starch bearing material, to enable a better understanding as to why less silk is necessary in my method. In addition to the germ, there are roughly speaking, two kinds of fibrous matter encountered in the manufacture of corn starch; the so-called "coarse slop" and the so-called "fine slop." While these two substances may be similar chemically, they have decidedly different physical characteristics. In present day corn starch manufacture, the coarse slop is removed on copper screens and the fine slop on silk screens. The copper screens are not effective in removing all of the coarse slop, because a certain amount of the smaller size coarse slop passes through the perforations and travels with the starch and the remainder of the fibrous matter. Likewise a certain amount of the fine fibrous matter, that is the fine slop, is removed together with the coarse slop because it is enmeshed together with the coarse fibrous material when traveling over the copper screens. It has also been noted that the percentage of fine slop increases after treatment in a Buhr mill, due to the grinding action upon the fiber. Even after screening and tabling as it has been practiced in the past, traces of fiber in addition to accidental impurities, remain in the starch, and these are frequently removed on so-called "proving screens," which are screens covered with extra fine silk.

In addition to distinguishing generally between coarse and fine slops, it is possible to make a distinction between large size coarse slop, small size coarse slop, and "true fine slop." The true fine slop has decidedly different classifying characteristics than the large and small size coarse slop, and apparently comes from a different part of the corn kernel. The fine slop as it is commonly removed in prior corn starch manufacturing methods, consists mainly of true fine slop, together with a certain amount of small size coarse slop. It is this true fine slop which is extremely difficult to effectively remove by silk screens. It tends to clog the pores of the screens, and thus makes necessary a comparatively large area of silk to secure proper capacity. On the other hand small size coarse slop is fairly easily removed on silk screens.

It has been previously explained that in operation of centrifuges 1 and 2, a portion of the fibrous material is discharged together with the gluten overflow. This fibrous material discharged together with the gluten overflow is the true fine slop, referred to above. What actually happens is that a separation takes place within the centrifuges 1 and 2, between the true fine slop, and large and small sized coarse slop, in addition to the centrifugal separation between the starch and gluten. Since in my method the silk screens act only upon the underflow from centrifuges 1 and 2, which is free of the true fine slop, it is apparent why a considerably less amount of silk is required, and why the removal of fibrous material from the starch is materially facilitated.

The action of the first centrifuging stage upon the fine slop causes a classification of the fine slop fiber into two portions, one passing out in the overflow and the other passing out in the underflow. That portion appearing in the overflow tends to be of a filamentary nature and in contrast with the more flake-like fiber remaining in the underflow it is somewhat more difficult to remove by silk screening. Irrespective of the precise character of the fiber appearing in the overflow and underflows the process eliminates a substantial proportion of the fine fiber by separating it from the starch and discharging it with the gluten, thus leaving a greatly reduced amount of fiber with the starch for removal by fine screening.

It is of course possible to utilize an arrangement of centrifuges such as has been described, where the milling system produces only Buhr mill starch from which fine fiber has not been removed. However, it is desirable to centrifuge a relatively high gravity grit starch for the reason that the load upon the Buhr mills and slop reels is thereby considerably reduced, with resultant simplification of this portion of the equipment utilized.

With respect to the connections between the centrifuges, it has been previously pointed out that wash liquor is introduced into each centrifuge together with the returned portion of the underflow, so that wash liquor is delivered from the centrifuge together with the overflow. In this connection it should be noted that the quantity of water in the wash liquor should exceed the quantity of the water discharged from the machine in the underflow. The excess wash liquor which is needed to pass out with the overflow of centrifuge 4 is obtained from the filtrate of the filter system 97. It is for this reason that flow line 111 has been shown in Fig. 1, to divert filtrate from line 104, to centrifuge 4. Because a part of the filtrate from flow line 104 is diverted to centrifuge 4, a like amount is diverted from line 93, representing the overflow from centrifuge 4, to supply wash liquor for centrifuge 3. This diversion is represented in the flow sheet by line 109. As has been previously explained, the overflow from centrifuge 3 serves as a wash for the germ and slop reels and because this overflow is robbed for the excess wash liquor for centrifuges 1 and 2 (line 108) a like amount of overflow from centrifuge 1 is added to the overflow from centrifuge 3 to make up for this deficiency. It will be noted from the flow sheet of Fig. 1 that the compensation for this makeup in turn is represented by flow line 74 and is drawn from the overflow of centrifuge 1.

Attention is also directed to the manner in which excess overflow is taken from centrifuge 1. It has been found that if material of this overflow is permitted to be substantially quiescent, the gluten almost immediately rises to the surface, and by drawing off excess liquor below this cloud of gluten, a comparatively clear liquid is obtained, suitable for washing operations in the wet starch milling system. Such an arrangement affords a rapid and convenient method of obtaining such liquid. Separator 68, which may be similar to a standard germ separator except that it is somewhat shortened, performs this function upon the overflow from centrifuge 1. It should be noted that the amount of liquor drawn off at separator 68 and delivered to the germ washing system only compensates for the excess amount of water sent to centrifuges 1 and 2, over the underflow drawn off these centrifuges. In addition to the above discussion concerning the manner in which wash liquors are handled in my system, I wish to point out a general distinction between my invention and the prior art. It will be noted that the wash water which is being introduced by way of line 101, and which augments the moisture in the steeped corn to deliver the mill starch to centrifuges 1 and 2, is used first to wash the small size coarse slop in screens 79 and 89, after which it is diverted by way of line 113 to wash the large size coarse slop. This manner of countercurrent washing makes it possible to give the coarse slop a thorough washing without returning any gluten or overflow water to the milling process for washing purposes, with exception of the water absorbed by the steeped corn. Thus the majority of the water introduced into the steeping apparatus 9 from settler 71, is made up of water introduced by way of line 101.

In actual tests of my process, utilizing centrifuges of the class described, the percentage of starch in the gluten overflow from the centrifuges 1 and 2 has been recorded below 12%. This compares favorably with 30% starch in the gluten and 20% starch in the fine slop, which is considered good results with processes heretofore practiced. Such favorable results can be obtained without the use of excessive quantities of fresh water, because the washing of the true fine slop is obviated entirely, and because the small size coarse slop is washed in the same liquid in which it was carried out of the centrifuges 1 and 2. In this connection note particularly the arrangement of silk shakers 79 and 89, which makes available practically unlimited quantities of water for washing the small size coarse slop.

A modification of my process is illustrated in the flow sheet of Fig. 2. In this case no water is drawn off the overflow from centrifuge 1 for use in the milling system, but extra water for enabling an increase in the gravity of the feed to centrifuge 2 and in order to obtain compensating wash water for the excess overflow in centrifuges 1 and 2, is obtained by installing a filter in the Buhr mill starch line 56. Thus a filter 231 is shown introduced into the Buhr mill starch line 56, and the filtrate from this filter is shown being diverted into the overflow line 106 from centrifuge 4 by way of line 232. A certain amount of this filtrate can also be drawn off by way of line 233, and merged with the overflow line 91 from centrifuge 3. The gluten overflow from both centrifuges 1 and 2 has been merged together and is being shown delivered to settler 71 by way of line 234. In this process, as in the process described with respect to Fig. 1, an effort is made to draw off as much grit starch as possible through line 28, at as high a gravity as possible, to reduce the amount of water to be drawn off by way of filter 231 imposed in the Buhr mill starch line 56.

It has been pointed out that in the method of Fig. 1 an excess of overflow is obtained from certain of the centrifuges without increasing the amount of fresh water introduced into the system. To review briefly, a part of the overflow from centrifuge 3 is by-passed to the line 106 of centrifuges 1 and 2, by way of line 108, and such by-passing is compensated for by returning a part of the overflow of centrifuge 1 by way of line 74. In Fig. 2 the excess overflow is obtained by directing part of the filtrate from filter 231 to line 106, by way of line 232a. The amount passing through line 108 in this case compensates only for the amount passed through line 109.

Aside from the particular routing of wash liquors shown for the centrifuge system in Figs. 1 and 2, it will be apparent that this particular system or method involves the use of a plurality of centrifuges in counterflow series with the underflow pass from one stage as a feed to the next stage. Filtrate from the filter operation 97 is used as a wash in a preceding centrifuge stage, and fresh water is introduced into the last stage. The counterflow arrangement of the centrifuges results in effective separation of starch from gluten and solubles, and gluten and solubles are concentrated in the overflow from the first stage.

Figs. 7 to 14 inclusive show additional embodiments of my process. In these figures the dotted, dot dash, and solid line conventions as used in Figs. 1 and 2, have not been followed, and the diagrammatic showing of the centrifuges and other parts of the system have been simplified.

Referring first to the process represented by Fig. 8, the material in the conventional steeps 310 is delivered to a wet milling system represented by the grit system 311a and the slop system 311b. The conventional Buhr mill 312 serves to grind the material passing to the slop system for further treatment. The grit system 311a may follow conventional practice, and the grit starch stream 313 drawn off the same is shown being delivered to the tables 314 for primary separation between starch and gluten. The slop system 311b departs from conventional practice in that the silk screens which are generally employed for the removal of fine slop are omitted. Thus the draw-off 315 of starch-bearing liquor from this system includes all of the material passing through the usual copper screens for the removal of coarse slop, and therefore contains the fine slop which otherwise would have been washed and removed on silk screens.

The draw-off 315 is shown being treated upon a silk screen 316, which can be presumed as representative of the first silk screen or stage of screens such as are employed in a complete fine slop system, and which is commonly referred to as drain silk. The tailings 317 from silk screen 316, which, according to prior practice are repeatedly treated over a series of further silk screens, serve as a feed for the centrifuges 318. Line 319 represents an overflow from the centrifuge, line 321 represents an underflow, line 322 represents a continuous return of a major part of the underflow back to the centrifuge rotor, and line 320 indicates introduction of a wash liquor for supplying liquid for the underflow. The troublesome filamentary slop passes out with the overflow 319 and the remainder of the slop passes out with the underflow 321. At the same time a substantial separation takes place between the starch and the gluten, whereby the gluten passes out with the overflow 319 and starch particles are carried out in the underflow 321. The underflow 321 is now treated upon the silk screens 323 and 326, for the removal of the remaining fine slop. Tailings from screen 323 are shown being passed to the screen 326, and the final tailings 327 from screen 326 are shown being delivered back to the slop system 311b where they may be introduced into the slop expeller or the filters. Line 328 represents use of material passing through screen 326 as a wash upon screen 323, and the starch-bearing liquor from screen 323 is shown being removed by line 329. Wash for screen 326 is shown being supplied through line 331.

The starch-bearing material passing through silk screen 316, represented by line 332, is shown being merged with the flow through line 329, to form a Buhr mill starch flow 333 to the table 314. The tabling may follow conventional practice and need not be described in detail. A starch flush-off cycle is indicated diagrammatically at 334, with the starch being received by filter 336. Dry side filtrate 337 can be routed in various ways for use as a wash liquor. Thus a part of the filtrate represented by line 338 is shown being supplied to the starch flush-off cycle 334, another part represented by line 339 being returned to the slop system for use as a wash upon the copper screens, and another part represented by line 331 for use as a wash on screen 326. This dry side filtrate may also supply wash 320 to the centrifuge 318. A part of the wet side filtrate, represented by line 341, can be returned to the slop system 311b, to be used as a wash on the copper screens.

The overflow 319 of centrifuge 318, which contains the gluten, can be merged with the gluten flow line 342 from tables 314 and delivered to gluten dewatering apparatus 343. As indicated by lines 344 and 346, a part of the liquor drawn off from the gluten in apparatus 343 can be returned to the steeps 310, and another part to the grit system 311a to be used as a wash.

Operation of the process shown in Fig. 8 will be evident from the above description. The tailings from screen 316 are subjected to classification in centrifuge 318, and the troublesome filamentary slop, together with gluten, passes out in the overflow 319. Treatment upon silk screens 323 and 326 serves to remove the remaining fine slop, and the starch-bearing liquor passing through these screens, together with the starch flow 332 from screen 316, merges with the grit starch stream for tabling.

Fig. 9 shows another embodiment employing centrifuging in place of tabling as in Fig. 8. In this case the grit starch stream 313 is fed to the centrifuge 348, represented as being of the type disclosed in Letters Patent Nos. 1,923,454 and 1,945,786. Gluten from the starch stream 313 passes out in the overflow 349, and separated starch in the underflow 351. Line 352 represents a continuous return of a major part of the underflow back into the centrifuge rotor. The starch-bearing liquor passing through silk screen 316 is also shown treated in a centrifuge 353, the overflow 354 from which may merge with the overflow 349, to be delivered to the gluten dewatering apparatus 356. The starch underflow and the return circuit for centrifuge 353 are indicated at 357 and 358 respectively. Both of the underflow streams 351 and 357 are shown being merged to form in part a feed for the further centrifuge 359.

The tailings from screen 316 are supplied in the feed to the centrifuge 318 for classification, and the underflow from the centrifuge is treated upon the screens 323 and 326, the same as in Fig. 1. The overflow 361 from centrifuge 359, which is a relatively clear liquid, can be used in part as a wash upon screens 323 and 326, and in part returned back to the slop system 311b to serve as wash upon the copper screens. The starch-bearing liquor passing through screens 323 and 326 can be merged with the underflows from centrifuges 348 and 353, thus providing a properly diluted feed to the centrifuge 359. The overflow 319 from centrifuge 318 can be delivered through a separate gluten dewatering apparatus 362, with the water removed in this apparatus being returned for prior operations such as the slop system 311b. The starch underflow 363 from centrifuge 359 is shown being delivered to the starch filter 364, where the starch is subjected to washing with fresh water. In order to supply all of the centrifuges with wash liquor, wet side filtrate 366 from the filter 364 has been shown routed for introduction into the return circuit of centrifuges 348, 353 and 318. Similarly, dry side filtrate 367 is shown being introduced as a wash into the centrifuge 359. With respect to the use of wash liquor in the centrifuges 348, 353 and 318, I prefer to provide an amount of wash which is substantially sufficient to provide liquid for carrying out starch in the respective underflows. In the centrifuge 359, however, a somewhat greater quantity of wash is introduced, to provide an excess over that required for carrying out starch in the underflow 363, the excess flowing counter-currently through the centrifuge rotor, and being discharged with the overflow 361. Such operation makes for more efficient separation of starch from gluten, thus facilitating subsequent filtration and washing.

The process of Fig. 10 differs from the processes of Figs. 8 and 9 in that the fine slop is permitted to stay with the main mill starch stream, and it is classified in centrifugal separating apparatus simultaneously with primary separation between starch and gluten. Furthermore Fig. 10 is greatly simplified in comparison with Figs. 1 and 2, particularly in that a combined mill starch stream is centrifuged. Thus, in this instance the milling system has been indicated generally at 311, and may follow conventional practice with respect to the removal of germs as indicated at 372, the removal of slop as indicated at 373, and the delivery of a mill starch stream 374. However, in this instance the conventional fine slop system formed by silk screens (silk screens following the usual Buhr mill copper screens), is omitted. Thus the fibrous material removed in the milling system is only coarse slop such as is removed on copper screens, and the mill starch stream 374 contains the fine slop which otherwise would have been removed by the conventional fine slop system.

The mill starch stream 374 is fed to the centrifuge 376, which may be of the type previously described. Lines 377 and 378 from the centrifuge represent a gluten overflow and a starch underflow, respectively, and line 379 represents a continuous return of a major part of the underflow back to the centrifuge rotor.

Due to the classification which takes place in centrifuge 376 (Fig. 10), substantially all of the filamentary slop passes out with the gluten overflow 377, and the remaining slop passes out with the starch underflow. The starch underflow is shown being delivered to one or more screens 381, from which the starch passing through the silk is delivered to further treating apparatus, such as the starch filter 382. As a desirable arrangement, the tailings from screen

381 can be delivered to additional silk screens 383, and the tailings from the latter can be delivered through line 384 to the slop expeller or filter 386 of the milling system. Line 387 indicates delivery of starch passing through screen 383 to filter 382.

Wash water for the screens 381 and 383 may be provided from a convenient source, as for example filtrate from the wet side of filter 382. Thus the filtrate from the wet side, represented by line 388, is shown being delivered in part upon the screens 381 and 383, with the remainder being returned to the milling system 311. Filtrate from the dry side of filter 382, represented by line 389, is shown being delivered in part as a wash to the return circuit 379 of centrifuge 376 (line 391), with the remainder going to the milling system 311 by line 392.

The gluten overflow 377 is shown being delivered to an apparatus 393, which may consist of gluten settlers and filter presses, for effecting removal of water, after which the gluten cake can be delivered to further apparatus for final drying. At least a part of the water removed by apparatus 393 can be utilized, if desired, as indicated by line 394 leading back to the steeps 310.

Operation of the process of Fig. 10 can be briefly outlined as follows: The mill starch received by centrifuge 376, which contains the fine slop which would otherwise have been removed in a conventional fine slop system, is subjected to centrifugal separation to form the gluten overflow 377 and the starch underflow 378. Because of the continuous introduction of wash liquor by line 391 into the return circuit 379, the original liquor carried with the feed is substantially entirely displaced, so that the wash liquor supplied serves to carry out starch in the underflow 378. Simultaneously with the separation between starch and gluten, a classification of the fine slop occurs, causing the filamentary slop and slimes to pass out with the gluten overflow 377. Treatment of the starch underflow on screens 381 and 383 effects removal of the fine slop contained therein, which tails off to the line 384. The screened starch passes to the filter 382 for further washing and dewatering.

With a process of this character, as is also true of Figs. 1 and 2, the amount of starch recovered per bushel of corn treated is considerably higher than in conventional prior practice, and the quality of the recovered starch is relatively high, with a minimum percentage of protein. This is in part due to more effective washing of the fine slop and to the displacement taking place during separation in centrifuge 376, whereby solubles contained in the mill starch stream are effectively passed out with the gluten overflow 377. Aside from a high quality starch, a high protein gluten is provided which commands a premium price upon the market.

In the above description of Fig. 10, it has been presumed that the grit starch system of the general milling system is in conformance with conventional practice, with silk screens being utilized in effecting separation of grits from the grit starch, the grits subsequently being ground and the starch and gluten therefrom merging with the starch draw-off from the coarse slop system. Fig. 11 illustrates a system in which silk from the grit system can be omitted, as well as other silk in the milling system, and in which all of the starch magmas are merged together for primary separation. In such event, the mill starch stream 374 contains not only fine slop which otherwise would have been removed in a conventional fine slop system, but also grits. After treatment of this feed in the centrifuge 376, grits pass out with the starch in the underflow 378. In treatment of the starch on screen 381, the grits tail off, together with slop, and are subjected to grinding by mill 396. This ground material is then treated upon the silk screen 383, and the material passing through this screen, consisting mainly of fine starch together with some gluten, is delivered by line 397 back to the milling system 311. Utilization of this liquor may be made in the milling system for washing purposes, with an eventual merging into the mill starch stream 374. With such a process, 100% elimination of silk screening can be effected in the milling system 311, with less washing in the grit system and with a proportionately greater draw-off of starch from the same.

In a practical operating process following the general arrangement of Fig. 11, it is desirable to employ two centrifuges operating in series, in place of a single centrifugal separating apparatus. Also one may not require more than two centrifuge stages, as in Figs. 1 and 2. Such a modification, in which the silk screens 381 and 383 are inserted between the two centrifuges, is shown in Fig. 12. Thus, the mill starch stream 374 from the milling system 311 feeds the first centrifuge 376a, and the starch underflow from this machine is supplied to the silk screen 381. After passing through this screen, the starch liquor is supplied to the second centrifuge 376b, by line 398. The starch underflow take-off from the machine 376—b is shown delivered to the starch filter 382 by line 399. The dry side filtrate from filter 382 can be used as a wash in the return circuit of centrifuge 376b, as indicated by line 401. The overflow 402 from centrifuge 376b is relatively clear liquid and can be used in part as a wash upon screens 381 and 383, and in part returned back to the milling system 311. Thus, line 403 represents delivery of a part of this overflow to the screens 381 and 383 as a wash, while line 404 represents return back to the milling system 311 where it can be utilized for various washing operations. In addition to serving as a wash, it is evident that a part of the overflow from the second centrifuge also serves to dilute the feed to the same. Filtrate from the wet side of filter 382, which contains a somewhat higher percentage of solubles than filtrate from the dry side, can be used as a wash in the first centrifuge 376a, as indicated by line 406.

As previously described, the flow rates of feed and wash with respect to the two centrifuges (Fig. 12) should be adjusted to secure proper operation, with primary separation between starch and gluten and a classification of the fine slop taking place in centrifuge 376a, and with a secondary clean-up separation taking place in centrifuge 376b. In one suitable method of operation the rate of introduction of wash liquor into centrifuge 376a is sufficient to supply water removed with the underflow 378, or even a somewhat lesser rate, so that a minor part of the liquid from the feed likewise merges with the underflow. However, in the second centrifuge 376b the wash liquor is introduced at such a rate that it not only supplies liquid for the underflow 399, but also causes an upflow of a certain amount of wash through the centrifuge rotor and the zone of separation, to merge with the overflow 402.

With the arrangement of Fig. 12, in the event silk screens are omitted from the grit starch system, a mill 396 can operate upon the tailings from screen 381, to grind the grits separated thereon. While this may involve a slightly additional amount of gluten in the material passing through screen 383, this factor is offset by the centrifugal separation to which the material is subjected in centrifuge 376b.

Fig. 13 illustrates a process similar to that of Fig. 12, except that a combined mill starch stream is subjected to partial dewatering before feeding the same to the first centrifuge 376a. To effect such dewatering, a suitable continuous filter 408 can be employed, which operates upon a part of the mill starch stream. The cake from this filter is repulped with the remainder of the mill starch stream, as indicated at 409, to make up a relatively high gravity feed 411 to the centrifuge 376a. Filtrate from the filter 408 can be returned to the milling system, as indicated at 412, for re-use in various washing or milling operations. The advantage to be gained by such a process is to reduce the volume of material handled by centrifuge 376a, by virtue of the higher gravity feed, thus increasing the capacity of a given size of centrifugal separating apparatus. If desired, all of the mill starch stream can be subjected to filtration and the filter cake repulped with another available liquor.

Fig. 14 shows a simplified process in which starch magmas from the germ and coarse slop systems are separately centrifuged, as in Figs. 1 and 2. In this instance the grit and slop systems are indicated at 415 and 416 respectively, with a Buhr mill 417 or like apparatus operating upon the starch-bearing material being delivered to the slop system 416 for further screening and washing. It will be presumed in this instance that it is desired to omit all silk screening in the milling system; therefore no silk screens or silk shakers are employed in the grit system 415, and in the slop system 416 the material is treated only on copper screens for the removal of coarse slop. The mill starch stream 418 from the grit and germ removal system 415 is shown being subjected to filtering at 419 and repulping at 421 with the remainder of the mill starch stream, to effect dewatering substantially as described with respect to Fig. 13. Filtrate 422 is returned to the grit system 415 to be used in washing operations. A mill starch feed 423 of relatively high gravity is delivered to the centrifuge 424a, from which the gluten overflow 426 and the starch underflow 427 are taken off. The starch underflow is treated on the silk screens 428 and 429, the tailings from which are delivered to the feed of Buhr mill 417 by line 431. The tailings in this instance consist mainly of grits, together with flake-like slop which may be present.

The material passing through silk screens 428 and 429 forms the feed for the second centrifuge 424b, where the starch is subjected to further centrifugal separation and washing. The overflow 432 from this second centrifuge is used in part as a wash upon silk screens 428 and 429, and the remainder is returned to the grit system 415 for washing operations. The underflow take-off 433 from the second centrifuge 424b can be treated to further washing and filtration, as has been previously described in connection with the other embodiments. Likewise, wash liquor, as for example from the finishing starch filter, is supplied to the centrifuges 424a and 424b as indicated.

The mill starch stream 434 from the slop system 416 is likewise shown being dewatered, as indicated by filter 436 and repulping operation 437, to form the feed 438 to the centrifuge 439a. The gluten overflow 441 from the centrifuge 439a can be merged with the overflow 426 from centrifuge 424a and delivered to dewatering means 442. Liquid recovered from dewatering means 442 can at least in part be returned to the steeps 310, as indicated by line 443. The starch underflow 444 removed from centrifuge 439a is shown being treated upon the silk screens 446 and 447, from which the material passing therethrough is supplied as a feed to the second centrifuge 439b. The overflow 448 from centrifuge 439b can be used in part as a wash on silk screens 446 and 447, and in part returned back to the slop system 416 for washing operations. The tailings 449 from silk screens 446 and 447 consist largely of flake-like fine slop and can be delivered to the slop expeller or filter 451 of the slop system 416.

The starch underflow 452 taken off centrifuge 439b can be treated apart from the underflow 433 to effect a separate recovery. Wash liquor is also supplied to centrifuges 439a and 439b from a convenient source, as for example the filtrates from the starch filter operating upon the underflow 452. While no great amount of fine slop may be treated in centrifuge 424a, a classification of fine slop occurs in centrifuge 439a, to cause the slop of a filamentary nature to pass out in the gluten overflow 441 and the remaining slop to pass out in the underflow 444.

In the utilization of my invention, or of certain features thereof, one skilled in the art may be expected to make certain changes or adjustments to adapt the process to the equipment available or to prevailing conditions or requirements. The various flow sheets illustrated in the drawings are to be taken as diagrammatic representations of the various operations and equipment utilized, leaving a wide latitude of selection and arrangement in making commercial installations. For example, where single pieces of equipment are indicated, it is evident that two or more pieces of equipment can be utilized to secure a desired capacity. While a Peltzer type centrifuge, utilizing a continuous return circuit back into the rotor, has given good results, a centrifuge of this general type can be employed without a return circuit but with an additional supply of wash liquor to provide liquid for carrying out starch in the underflow. With respect to carrying out silk screening after primary separation between starch and gluten, it should be appreciated that this operation may not follow immediately after the first centrifugal separation but may follow two or more centrifuges operating in series or in parallel.

This application is a continuation and consolidation of subject matter disclosed and claimed in my copending applications Ser. No. 651,701, filed January 14, 1933, and Ser. No. 741,528, filed September 11, 1934.

I claim:

1. In the process of manufacturing starch from corn including subjecting the corn in a comminuted state to separating operations in water to remove the germs and coarse slop, yielding a starch milk containing fine slop; the improvement which comprises centrifuging said starch milk to remove the fine slop therefrom.

2. In the process of manufacturing starch from corn including subjecting the corn in a comminuted state to separating operations in water to remove the germs and the major portion of the bran, yielding a mixture of starch, gluten, residual bran particles and water; the improvement which comprises removing the gluten and bran from the starch by centrifugal force.

3. In the process of manufacturing starch from corn including subjecting the corn in a comminuted state to separating operations in water to remove the germs and the major portion of the bran, yielding a mixture of starch, gluten, residual bran particles and water containing corn solubles; the improvement which comprises removing from the starch by centrifugal force the gluten, bran and the major portion of said solubles.

4. In the process of manufacturing starch from corn including subjecting the corn in a comminuted state to germ and coarse slop separating operations in water; the improvement which comprises subjecting the magmas from said separating operations to centrifugal force to remove from the starch the gluten and fine slop.

5. In the process of manufacturing starch from corn including subjecting the corn in a comminuted state to germ and coarse slop separating operations in water; the improvement which comprises subjecting the magmas from said separating operations to centrifugal force to remove from the starch the gluten, the fine slop and the major portion of the solubles.

6. In a wet starch manufacturing process utilizing wet milling operations to produce a mill starch, the improvement comprising omitting from the milling operations the conventional fine slop system, whereby the mill starch stream contains incompletely washed fine slop which otherwise would have been removed, subjecting the mill starch to centrifugal separation to form a gluten overflow and a starch underflow, thereby causing a classification of the fine slop to take place simultaneously with the centrifugal separation whereby filamentary slop passes out with the gluten overflow and the other part of the slop passes out with the starch underflow, and then subjecting the starch underflow to screening for the removal of slop carried therein.

7. In a wet starch manufacturing process utilizing wet milling operations to produce a mill starch, the improvement comprising omitting from the milling operations the conventional fine slop system, whereby the mill starch stream contains substantially all of the fine slop which otherwise would have been removed, subjecting the mill starch to centrifugal separation to form a gluten overflow and a starch underflow, thereby causing a classification of the fine slop to take place simultaneously with the centrifugal separation whereby filamentary slop passes out with the gluten overflow and the other part of the slop passes out in the starch underflow, subjecting the starch underflow to screening for the removal of slop carried therein, and introducing a wash liquor to the centrifugal separating operation to supply liquid for the starch underflow.

8. In the process of manufacturing starch from corn including subjecting the corn in a comminuted state to separating operations in water to remove the germs and coarse slop, yielding a starch milk containing fine slop; the improvement which comprises subjecting said starch milk to a series of centrifuging operations, in countercurrent arrangement, for removing the fine slop therefrom.

9. In the process of obtaining starch from corn in which the corn is steeped and subjected to germ and coarse slop separations; the improvement which consists in subjecting the starch milk from said separations to centrifuging operations to remove the gluten and fine slop from the starch, giving process waters of relatively higher and lower contents of solubles; reusing process water having the higher solubles content for steeping corn as the process proceeds; and using process water of lower solubles content at later stages of the process.

10. In a wet starch manufacturing process utilizing wet milling operations to produce a mill starch, the improvement comprising omitting conventional fine screening from the milling operations for the removal of fine slop, whereby the mill starch stream contains substantially all of the fine slop which otherwise would have been removed, subjecting the mill starch to centrifugal separation to form a gluten overflow and a starch underflow, thereby causing a classification of the fine slop to take place simultaneously with the centrifugal separation whereby filamentary slop passes out with the gluten overflow and the other part of the slop passes out in the starch underflow, subjecting the starch underflow to fine screening for the removal of slop carried therein, subjecting the screened starch to further centrifugal separation thereby forming an overflow and a starch underflow, and utilizing at least a part of said overflow as a wash liquor for said last-mentioned screening operation.

11. In a wet starch manufacturing process utilizing wet milling operations to produce a mill starch, the improvement comprising substantially omitting from the milling operations the conventional fine slop system, whereby the mill starch stream contains fine slop which otherwise would have been removed, subjecting the mill starch to centrifugal separation to form a gluten overflow and a starch underflow, thereby causing a classification of the fine slop to take place simultaneously with the centrifugal separation whereby filamentary slop passes out with the gluten overflow and the other part of the slop passes out in the starch underflow, subjecting the starch underflow to silk screening for the removal of slop carried therein, subjecting the screened starch to further centrifugal separation thereby forming an overflow and a starch underflow, introducing wash liquor to the last-mentioned centrifugal operation in an amount sufficient to form the liquid in the underflow with an excess for merging with the overflow, and utilizing at least a part of said last-mentioned overflow as a wash in said screening operation.

12. In a wet starch manufacturing process utilizing wet milling operations to produce a mill starch, the improvement comprising substantially omitting from the milling operations the conventional fine slop system whereby the mill starch stream contains fine slop which otherwise would have been removed, subjecting the mill starch stream to centrifugal separation, thereby forming a gluten overflow and a starch underflow, supplying a wash liquor to said centrifugal separating operation thereby providing liquid for the starch underflow, subjecting the starch underflow to fine screening, subjecting the screened starch to further centrifugal separation thereby forming an overflow and a starch underflow, supplying wash liquor to the second-mentioned centrifugal separating operation to supply liquid for the underflow, and utilizing a part of the overflow from the last-mentioned centrifugal separating operation as a wash for said fine screening operation.

13. In a wet starch manufacturing process utilizing wet milling operations to produce a mill starch, the improvement comprising substantially omitting from the milling operations the conventional fine slop system together with fine screening in the grit system, whereby the mill starch stream contains incompletely washed fine slop together with grits, subjecting such mill starch to centrifugal separation, to form a gluten overflow and a starch underflow, thereby causing a classification of the fine slop to take place simultaneously with centrifugal separation, whereby filamentary slop passes out with the gluten overflow and the other part of the slop passes out in the starch underflow, and subjecting the starch underflow to screening for the removal of the slop carried therein and for the removal of grits.

14. In a wet starch manufacturing process utilizing wet milling operations to produce a mill starch, the improvement comprising substantially omitting from the milling operations the conventional fine slop system together with fine screening in the grit system, whereby the mill starch stream contains incompletely washed fine slop together with grits, subjecting such mill starch to centrifugal separation to form a gluten overflow and a starch underflow, thereby causing a classification of the fine slop to take place simultaneously with centrifugal separation, whereby filamentary slop passes out with the gluten overflow and the other part of the slop passes out in the starch underflow, subjecting the starch underflow to screening for the removal of the slop carried therein and for the removal of grits, and then subjecting the grits to grinding and effecting further removal of starch therefrom.

15. In a wet starch manufacturing process utilizing wet milling operations to produce a mill starch, the improvement comprising omitting from the milling operations the conventional fine slop system, whereby the mill starch stream contains fine slop which otherwise would have been removed, subjecting the mill starch stream to partial dewatering to form a mill starch of substantially higher gravity, subjecting the higher gravity mill starch to centrifugal separation to form a gluten overflow and a starch underflow, thereby causing a classification of the fine slop to take place simultaneously with centrifugal separation whereby filamentary fine slop passes out with the gluten overflow and the other part of the slop passes out in the starch underflow, and then subjecting the starch underflow to screening for the removal of slop carried therein.

16. In a wet starch manufacturing process utilizing wet milling operations to produce a mill starch, the improvement comprising omitting conventional fine screening from the milling operations for the removal of fine slop, whereby the mill starch stream contains substantially all of the fine slop which otherwise would have been removed, subjecting the mill starch to centrifugal separation thereby forming a gluten overflow and a starch underflow, the centrifugal separation also causing a classification of the fine slop to take place simultaneously therewith whereby filamentary slop passes out with the gluten overflow and the other part of the slop passes out in the starch underflow, subjecting the starch underflow to screening for the removal of slop carried therein, subjecting the screened starch to further centrifugal separation thereby forming an overflow and a starch underflow, subjecting the starch in said last underflow to washing, and utilizing liquor from said washing operation as wash liquor for said first named centrifuging operation.

17. In a wet starch manufacturing process in which starch-bearing material is treated in steeping and milling systems to afford a mill starch stream, the milling system being characterized by the substantial absence of silk for the removal of fine slop whereby the mill starch stream contains the fine slop which otherwise would have been removed, the improvement comprising subjecting the mill starch stream to centrifugal separation whereby gluten passes out in an overflow and starch passes out in an underflow, thereby causing a classification of fine slop to take place simultaneously with the centrifugal separating operation whereby a part of the slop passes out with the overflow and the remainder of the slop passes out with the underflow, supplying a wash liquor to the centrifugal separating operation to provide liquid for the starch underflow and to effect substantial displacement of gluten and solubles from the starch, said wash liquor having a relatively low percentage of solubles compared with the percentage of solubles in the mill starch stream, and then subjecting the starch underflow to silk screening and washing for the removal of slop carried therein.

18. In a wet starch manufacturing process in which a magma is produced containing starch, gluten, and slop fiber, subjecting the magma to fine screening whereby slop fiber is removed in tailings from said operation, centrifuging the tailings whereby the gluten content thereof together with a substantial part of the fiber passes out in an overflow and whereby the starch content with residual fiber passes out in an underflow, and subjecting the underflow to fine screening to remove fiber from the same, and removing starch from the screened magma.

19. In a starch manufacturing process making use of steeping followed by wet separating operations to produce a liquor containing starch and gluten, the improvement comprising subjecting the liquor to continuous centrifugal separation to separately remove gluten in an overflow and starch in an underflow, supplying to the zone of centrifugal separation a wash liquor serving to displace solubles from the separated starch, whereby displaced solubles are caused to pass out in the gluten overflow, making use of process water derived from the gluten overflow for steeping, and making use of process water obtained from the starch underflow, for subsequent stages of the process.

20. In a starch manufacturing process making use of steeping followed by comminuting and wet separating operations to produce a magma containing starch, gluten and solubles; the improvement comprising subjecting the magma to continuous centrifugal separation to separately remove gluten in an overflow and starch in an underflow, supplying to the zone of centrifugal separation a wash liquor serving to displace solubles from the separated starch, whereby displaced solubles are caused to pass out in the gluten overflow, using at least a substantial part of process water derived from the gluten overflow for steeping, and making use of process water derived from the starch underflow for subsequent stages of the process.

21. In a starch manufacturing process making use of steeping followed by comminuting and wet separating operations to produce a magma containing starch, gluten and solubles; the improvement comprising subjecting the liquor to continuous centrifugal separation to separately remove gluten in an overflow and starch in an underflow, supplying to the zone of centrifugal separation a wash liquor serving to displace solubles from the separated starch, whereby displaced solubles are caused to pass out in the gluten overflow, and utilizing process waters derived from the gluten overflow and from the starch underflow in the process, the process water derived from the starch underflow being reintroduced into the process at stages subsequent to introduction of process water derived from the overflow.

22. In the manufacture of starch from corn, subjecting corn to operations including steeping, comminuting, and wet separating operations to produce a magma containing starch, gluten and solubles, supplying the magma to the first one of a series of centrifugal separating stages, in which the underflow from one stage is passed to the next succeeding stage, supplying wash liquor to each stage whereby a displacement action takes place simultaneously with centrifugal separation, withdrawing from the centrifuge system overflow from the first stage and also overflow from a succeeding stage, removing gluten from the first stage overflow to provide process liquor, using at least a substantial part of such process liquor for steeping, and using at least a substantial part of the overflow withdrawn from said succeeding stage as process liquor in separating operations preceding the first centrifuge stage.

23. The process of manufacturing starch from corn comprising comminuting the corn; subjecting it to separating operations in water; subjecting the mill starch to a series of centrifuging operations through which the underflow moves in one direction and the overflow in the other; and in the case of one of said operations returning a part of the overflow back to the operation from which it came.

24. Process of manufacturing starch from corn which comprises; subjecting the mill starch to a series of centrifuging operations through which the underflow moves in one direction and the overflow in the other, introducing the overflow into the underflow zone of the centrifugal operation which said overflow enters; and, in the case of one of said operations, diverting a part of the overflow back to the centrifugal operation from which it came.

25. Method of separating solids of different specific gravities in suspension in water containing solubles which comprises: subjecting the menstruum to a series of centrifuging operations against a wash liquid introduced into the last centrifugal; and introducing the wash water and the overflow going from one centrifugal to the other into the underflow zone of the centrifugal, in each case, in order to concentrate the solubles with the lighter insolubles in the overflow.

26. In the manufacture of starch from corn comprising steeping the corn, comminuting it and subjecting it to separating operations in water yielding a mixture of starch, gluten and water; the improvement which consists in subjecting the starch and gluten mixture to a series of centrifuging operations, against a wash water introduced into the last centrifugal; introducing the wash water and the overflow going from one centrifugal to the other into the underflow zone of the centrifugal in each case, in order to concentrate the solubles in the overflow; and using the overflow from the centrifuging operations for steeping the corn.

27. Method of treating mill starch to separate the gluten from the starch and concentrate the solubles with the gluten which comprises: subjecting the mill starch to a series of centrifuging operations in which the underflow moves in one direction and the overflow in the other direction; and introducing the overflow from each centrifugal machine, except in the case of the first machine of the series, into the underflow zone of the centrifugal to which said overflow is delivered.

28. In the manufacture of starch from corn, the method of separating gluten and solubles from starch which consists in subjecting the mill starch to a series of centrifuging operations in which the underflow moves from centrifugal to centrifugal in one direction and the overflow in the other and passing part of the overflow from one operation to and the rest around the next operation in advance, the by-passed portion being introduced into an operation further in advance, discharging from the centrifuging system overflow from the by-passed centrifugal, filtering the starch and introducing fresh water and filtrate from the filtering operation into the last centrifugal operation.

29. The process of manufacturing starch from corn comprising: steeping and comminuting the corn; subjecting the comminuted corn to separating operations in water to separate the mill starch from the germs and slop; subjecting the mill starch to a series of centrifuging operations in which the underflow from each centrifugal is introduced into the next centrifugal; introducing fresh water into the last centrifugal; causing the overflow from the centrifugals to be introduced into centrifugals in advance in the series; returning the overflow from the first centrifugal to the steeping operations; passing part of the overflow from one of the centrifugals to the centrifugal next in advance and the rest around the centrifugal next in advance to enter a centrifugal further in advance in the series; and re-using the overflow from the by-passed centrifugal in said separating operations.

30. The process of manufacturing starch from corn comprising steeping and comminuting the corn; subjecting the comminuted corn to separating operations in water to separate the mill starch from the germ and slop; subjecting the mill starch to a series of centrifuging operations in which the underflow from each centrifugal is introduced into the next centrifugal; introducing fresh water into the last centrifugal; causing the overflow from the centrifugals to be introduced into centrifugals in advance in the series; returning the overflow from the first centrifugal to the steeping operation; passing part of the overflow from one of the centrifugals to and the rest around the centrifugal next in advance, by-passed portion entering a centrifugal further in advance in the series; re-using the overflow from the by-passed centrifugal in the separating operations; filtering the starch from the last centrifugal; and returning filtrate from the starch filtering operation to the centrifugal system as a wash water.

31. Method of separating solids of different specific gravities in a liquid mixture containing solubles and concentrating the solubles with the lighter solids which comprises: subjecting the mixture to a series of centrifuging operations in which the underflow moves from centrifugal to centrifugal in one direction and the overflow in the other direction; causing part at least of the overflow from a centrifugal to by-pass the centrifugal next in advance in the series and then enter the centrifugal further in advance; and discharging from the system the overflows from the first centrifugal of the series and the by-passed centrifugal.

32. In a wet starch manufacturing process, where a starch magma containing starch and gluten is obtained from corn or like starch-bearing material, the improvement consisting in subjecting the starch magma to a centrifugal separating stage whereby gluten is discharged in an overflow and starch is discharged in an underflow, subjecting the underflow to a second centrifugal separating stage whereby a part of the remaining gluten is discharged in an overflow and starch is discharged in an underflow, utilizing a part of the last-mentioned overflow as wash liquor for introduction into the first-mentioned centrifugal separating stage, and diverting another part of the last mentioned overflow from the centrifuge stages.

33. A countercurrent method of treating a magma containing starch and contaminating ingredients, comprising subjecting the magma to a series of centrifugal separating stages in which the underflow moves from centrifugal to centrifugal, whereby starch is separated out in an underflow from the last stage and contaminating ingredients pass out in an overflow, subjecting the underflow from the last stage to filtration, using filtrate from the filtration operation as wash in a centrifuge stage preceding the last centrifuge stage, and introducing fresh water as a wash in the last centrifuge stage.

34. In a process of effecting separation and washing of solids contained in hydrous feed material, characterized by at least two serial stages of separation from each of which an overflow and an underflow are separately delivered; the steps of utilizing underflow from the first stage as a feed to the second stage, introducing fresh wash water into the second stage, causing the water delivered with the underflow from the second stage to substantially equal the amount of fresh liquor introduced into the same, supplying hydrous feed material to the first stage, supplying wash liquor to the first stage in addition to the feed thereto, introducing an additional amount of wash liquor into the second stage thereby increasing the overflow therefrom, and utilizing a part of the overflow from the second stage to supplement the wash liquor introduced into the first stage.

35. In the process of manufacturing starch from corn including subjecting the corn in a comminuted state to germ and coarse slop separating operations in water; the improvement which comprises subjecting the magma from the coarse slop separation to centrifugal force to eliminate the gluten and fine slop from the starch and separately subjecting the magma from the germ separation to centrifugal force to eliminate the gluten from the starch.

36. In the process of obtaining starch from corn in which the corn is steeped and subjected to germ and coarse slop separations yielding separate starch milk streams; the improvement which comprises subjecting the starch milk from the germ sepaartion to a centrifuging operation to remove the gluten from the starch; subjecting the starch milk from the coarse slop separation to a separate centrifuging operation to remove the gluten and fine slop; dewatering the starch, gluten and gluten and slop magmas from said centrifuging operations and using water therefrom having relatively high content of solubles for steeping corn as the process proceeds and water of lesser solubles content at the later stages of the process.

37. In the process of obtaining starch from corn in which the corn is steeped and subjected to germ and coarse slop separations yielding separate starch milk streams; the improvement which comprises subjecting the starch milk from the germ separation to a centrifuging operation to remove the gluten in an overflow and starch in an underflow; subjecting the starch milk from the coarse slop separation to a centrifugal operation to remove gluten and fine slop in an overflow and starch in an underflow; dewatering both the overflow and underflow materials, and utilizing a part of the water derived from the overflow for steeping corn and using another part for subsequent stages of the process, and using water derived from the underflow material in later stages of the process.

38. In a process of manufacturing starch from corn or like material by disintegrating the corn, the improvement consisting in separating the germs from the disintegrated corn, forming the disintegrated material into two grit starch magmas of different gravities, centrifuging the magma of highest gravity whereby gluten is discharged in an overflow and starch and grits are discharged in an underflow, removing grits from the underflow, subjecting the removed grits to grinding, forming mill starch from the magma of lowest gravity, blending the ground material with said mill starch, and then subjecting the blended material to centrifuging to remove starch therefrom.

39. In a process of manufacturing starch from corn or like material by disintegrating the corn, the improvement consisting in removing germs from the disintegrated corn in such a manner as to make available a grit starch of high gravity and a grit starch of relatively low gravity, centrifuging the higher gravity grit starch thereby separating the starch thereof from gluten and fiber, removing grits from the starch so centrifugally separated, grinding said grits to form a source of mill starch, separately grinding the grit starch of lower gravity, separating coarse slop from said last ground material thereby making available a second source of mill starch, centrifuging the mill starch made available from both said sources, thereby separating starch from gluten and fine fiber, and then washing the centrifugally separated starch and separating coarser fiber from the same.

40. In a process of manufacturing starch from corn or like material by disintegrating the corn, the improvement consisting in separating germs from the disintegrated corn in such a manner as to form two grit starch components of different gravities, centrifuging the grit starch of higher gravity to remove gluten and fiber therefrom, removing grits from the starch so centrifugally separated, grinding the grit starch of lower gravity, removing coarse fiber from the last-named material so ground thereby forming a mill starch for further treatment, separately grinding the grits removed from the starch so centrifugally separated, blending the last-named ground grits with mill starch, and then separating starch from the blended material.

41. In a process of manufacturing starch from corn or like material, characterized by disintegration of the corn and wet treatment of the components thereof, the improvement consisting in forming two starch-bearing liquors, one containing starch together with gluten, fibrous material and grits, and the other containing starch together with gluten and fibrous material, the fibrous material contained in said liquors constituting substantially all of the fibrous material produced in the system with the exception of coarse slop, independently subjecting each of said liquors to centrifugal separation whereby the starch thereof is removed from the majority of the fibrous material, removing grits from the starch removed from the first-named liquor, grinding said grits and merging the ground material with the second-named liquor before centrifuging of the same, and subjecting all of the removed starch to silk screening and washing to effect purification thereof.

42. In a process of manufacturing starch from corn or like material by disintegrating the corn, the improvement consisting in separating the germs from the disintegrated corn in such a manner as to form two grit starch liquors of different gravities, directly centrifuging the liquor of higher gravity whereby gluten is discharged in an overflow and starch and grits are discharged in an underflow, removing grits from the underflow, subjecting the removed grits to grinding, blending the ground material with mill starch obtained from the lower gravity grit starch, and then subjecting the blended material to centrifuging to remove starch therefrom.

43. In a starch making process, the steps of centrifuging a liquor containing starch and gluten whereby a major part of the gluten passes out in an overflow and the major part of the starch in an underflow, delivering the overflow to a separating container in which a body of the same is maintained substantially quiescent, thereby causing gluten to rise to the surface, and withdrawing the separated gluten from the upper portion of the separating container.

44. In a starch making process, the steps of centrifuging a liquor containing starch and gluten whereby a major part of the gluten passes out in an overflow and the major part of the starch in an underflow, delivering the overflow to a separating container in which a body of the same is maintained substantially quiescent, thereby causing gluten to rise to the surface, withdrawing the separated gluten from the upper portion of the separating container, and separately withdrawing liquor from a lower portion of the container for re-use.

45. An improvement in the wet starch process of obtaining starch from corn which comprises subjecting corn to steeping, comminuting and separating operations to produce a liquor containing starch and gluten, centrifuging the liquor whereby the starch passes out in an underflow, delivering the overflow from the centrifuging operation to a separator, establishing three draw-offs from the separator, one being from the upper level of the liquor in the separator and consisting of gluten which rises to the surface of a quiescent body of liquor in the separator, the second being from an intermediate level of the body of liquor in the separator, and the third being from the lower part of the separator, and utilizing said second draw-off as process liquor in separating operations of the process.

46. In a wet starch manufacturing process wherein a magma is formed containing finely divided starch, starch grits, and gluten, the steps of subjecting the magma to centrifuging whereby gluten is discharged in an overflow and starch and unground grits discharged in an underflow, separating the unground grits from the underflow, grinding said grits, and then separating starch from the ground material.

47. A countercurrent method of treating a magma containing starch and contaminating ingredients, comprising subjecting the magma to a series of centrifugal separating stages in which the underflow moves from centrifugal to centrifugal, whereby starch is separated out in an underflow from the last stage, and contaminating ingredients pass out in an overflow, subjecting the underflow from the last stage to filtration, diverting from the series overflow from a stage subsequent to the first stage, and using filtrate from the filtration operation as a wash in a centrifuge stage preceding said stage from which the overflow is diverted.

48. A counterflow method for treating magma containing starch and contaminating ingredients, subjecting the magma to a series of two centrifugal separating stages in which the underflow from the first centrifugal stage passes to the second stage, with separated starch passing out as an underflow from the second stage and contaminating ingredients of the magma passing out largely in the overflow from the first stage, subjecting the underflow from the last stage to filtration, using filtrate from the filtration operation as a wash in the first centrifuge stage, introducing fresh water as a wash in the last centrifuge stage, and diverting from the series overflow from the second stage.

ALBERT PELTZER.